United States Patent
Sethi et al.

(10) Patent No.: US 12,273,844 B2
(45) Date of Patent: Apr. 8, 2025

(54) UNAVAILABILITY PERIOD SUPPORT FOR MUSIM DEVICES

(71) Applicant: InterDigital Patent Holdings, Inc., Wilmington, DE (US)

(72) Inventors: Anuj Sethi, Ottawa (CA); Michael Starsinic, Newtown, PA (US); Saad Ahmad, Montreal (CA); Ulises Olvera-Hernandez, Saint-Lazare (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/780,419

(22) Filed: Jul. 22, 2024

(65) Prior Publication Data
US 2024/0381283 A1 Nov. 14, 2024

Related U.S. Application Data

(63) Continuation of application No. PCT/US2024/022990, filed on Apr. 4, 2024.
(Continued)

(51) Int. Cl.
*H04W 60/02* (2009.01)
*H04W 60/04* (2009.01)
*H04W 88/06* (2009.01)

(52) U.S. Cl.
CPC .......... *H04W 60/02* (2013.01); *H04W 60/04* (2013.01); *H04W 88/06* (2013.01)

(58) Field of Classification Search
CPC ...... H04W 60/02; H04W 60/04; H04W 88/06
See application file for complete search history.

(56) References Cited

U.S. PATENT DOCUMENTS 9,001,655 B2    4/2015  Watfa et al.
10,136,352 B2 * 11/2018 Jeong ................. H04W 76/18
(Continued)

FOREIGN PATENT DOCUMENTS

WO    2023/182874 A1    9/2023
WO    2024/096614 A1    5/2024

OTHER PUBLICATIONS

3rd Generation Partnership Project (3GPP), C1-226517, "Support for Unavailability Period", Qualcomm Incorporated, C1, 3GPP TSG-CT WG1 Meeting #139, Toulouse, France, Nov. 14-18, 2022, 84 pages.
(Continued)

*Primary Examiner* — Julio R Perez
(74) *Attorney, Agent, or Firm* — CONDO ROCCIA KOPTIW LLP

(57) ABSTRACT

The device may be a multi-universal subscriber identity module (MUSIM) device. The device may send a first registration request to a first network, for example, to enable an unavailability period feature with the second network. The registration request may indicate a first unavailability duration. The device may determine that an unavailability event is triggered. The device may determine that the device will be unavailable for a period of time. The device may receive a first registration response, for example, a first registration accept message. The first registration response may indicate a first registration duration. The device may determine a second unavailability duration. The device may send a second registration request to a second network, for example, indicate the second unavailability duration. The device may receive a second registration response. The second registration response may be a second registration accept message. The second registration response may indicate a second registration duration.

20 Claims, 14 Drawing Sheets

Related U.S. Application Data

(60) Provisional application No. 63/457,515, filed on Apr. 6, 2023.

(56) References Cited

U.S. PATENT DOCUMENTS

| | | | | |
|---|---|---|---|---|
| 11,483,880 | B2* | 10/2022 | Aramoto | H04W 28/0289 |
| 2012/0218889 | A1 | 8/2012 | Watfa et al. | |
| 2017/0127244 | A1* | 5/2017 | Kumar | H04W 60/04 |
| 2018/0014317 | A1* | 1/2018 | Gulati | H04L 5/0005 |
| 2020/0092425 | A1 | 3/2020 | Hietalahti et al. | |
| 2020/0162919 | A1 | 5/2020 | Velev et al. | |
| 2020/0367153 | A1* | 11/2020 | Sen | H04W 48/18 |
| 2021/0377789 | A1* | 12/2021 | Catovic | H04W 76/10 |
| 2022/0086790 | A1* | 3/2022 | Wang | H04W 60/04 |
| 2022/0201788 | A1 | 6/2022 | Kawasaki et al. | |
| 2022/0377693 | A1 | 11/2022 | Sugawara et al. | |
| 2023/0016724 | A1* | 1/2023 | Nayak | H04W 48/06 |
| 2023/0254733 | A1 | 8/2023 | Park et al. | |
| 2023/0319696 | A1 | 10/2023 | Kuge | |
| 2023/0337122 | A1* | 10/2023 | Tamura | H04W 48/16 |
| 2023/0362704 | A1 | 11/2023 | Edge et al. | |
| 2023/0403703 | A1 | 12/2023 | Kiilerich Pratas et al. | |
| 2024/0187973 | A1 | 6/2024 | Niemi | |
| 2024/0188184 | A1 | 6/2024 | Niemi | |
| 2024/0340885 | A1* | 10/2024 | Wang | H04W 74/002 |

OTHER PUBLICATIONS

3rd Generation Partnership Project (3GPP), C1-227130, "Support for Unavailability Period", Qualcomm Incorporated, Samsung, C1, 3GPP TSG-CT WG1 Meeting #139, Toulouse, France, Nov. 14-18, 2022, 94 pages.

3rd Generation Partnership Project (3GPP), C1-231179 (Was C1-231113), "Deletion of 5GS forbidden tracking areas for roaming added due to rejected S-NSSAI", 3GPP Draft, TSG-CT WG1 Meeting #140, Samsung, Athens, Greece, Feb. 27-Mar. 3, 2023, 99 pages.

3rd Generation Partnership Project (3GPP), C1-237179, "Handling of. the unavailability period during the network congestion", Suecr, 3rd Generation Partnership Project (3GPP), Mobile Competence Centre; 650, Route Des Lucioles; F-06921 Sophia-antipolis Cedex; France, Oct. 9-13, 2023, 3 pages.

3rd Generation Partnership Project (3GPP), C1-237180, "Applicability of unavailability period during network congestion", Interdigital, Type Cr, Cr 5720, Suecr, 3rd Generation Partnership Project (3GPP), Mobile Competence Centre, 650, Route Des Lucioles, F-06921 Sophia-antipolis Cedex, France, Oct. 9-13, 2023, 4 pages.

3rd Generation Partnership Project (3GPP), S2-2202942, "23.700-61: Solution for KI #1 Determination of unavailability period in 5GS", Apple, Sa WG2 Meeting #150e, Elbonia, Apr. 6-12, 2022, pp. 1-5.

3rd Generation Partnership Project (3GPP), S2-2206933, "Revision of Solution #16 for KI#1, K1#2: Support of UE Triggered Generalized Unavailability Period", 3GPP Draft, SA WG2 Meeting #152e, Qualcomm Incorporated, e-Meeting, Aug. 17-26, 2022, 4 pages.

3rd Generation Partnership Project (3GPP), S2-2209160, "Support of unavailability period", Samsung, Qualcomm, LG Electronics, Apple, SA2, 3GPP SA WG2 Meeting #153E, Electronic meeting, Oct. 10-17, 2022, 4 pages.

3rd Generation Partnership Project (3GPP), S2-2303427, "Support of discontinuous coverage", 3GPP TSG-WG SA2 Meeting #155, Athens, Greece, Feb. 20-24, 2023, 11 pages.

3rd Generation Partnership Project (3GPP), TR 23.700-08 V2.0.0, "Technical Specification Group Services and System Aspects, Study on enhanced support of Non-Public Networks, Phase 2 (Release 18)", Mar. 2023, pp. 1-177.

3rd Generation Partnership Project (3GPP), TR 23.700-28 V18.1.0, "Study on Integration of satellite components in the 5G architecture; Phase 2 (Release 18)", 3rd Generation Partnership Project; Technical Specification Group Services and System Aspects, Mar. 2023, 103 pages.

3rd Generation Partnership Project (3GPP), TR 23.700-61 V0.2.0, "Technical Specification Group Services and System Aspects; Study on Seamless UE context recovery (Release 18)", Apr. 2022, pp. 1-23.

3rd Generation Partnership Project (3GPP), TR 23.700-61 V18.0.0, "Technical Specification Group Services and System Aspects, Study on Seamless UE context recovery (Release 18)", Jun. 2022, pp. 1-25.

3rd Generation Partnership Project (3GPP), TS 23.288 V18.0.0, "Technical Specification Group Services and System Aspects, Architecture enhancements for 5G System (5GS) to support network data analytics services (Release 18)", Dec. 2022, pp. 1-220.

3rd Generation Partnership Project (3GPP), TS 23.501 V18.0.0, "Technical Specification Group Services and System Aspects, System Architecture for the 5G System (5GS), Stage 2 (Release 18)", Dec. 2022, pp. 1-593.

3rd Generation Partnership Project (3GPP), TS 23.501 V18.1.0, "Technical Specification Group Services and System Aspects; System architecture for the 5G System (5GS); Stage 2 (Release 18)", Mar. 2023, 667 pages.

3rd Generation Partnership Project (3GPP), TS 23.502 V18.1.0, "Technical Specification Group Services and System Aspects, Procedures for the 5G System (SGS), Stage 2 (Release 18)", Mar. 2023, pp. 1-827.

3rd Generation Partnership Project (3GPP), TS 23.502 V18.1.1, "Technical Specification Group Services and System Aspects, Procedures for the 5G System (5GS), Stage 2 (Release 18)", Apr. 2023, pp. 1-836.

3rd Generation Partnership Project (3GPP), TS 24.301 V18.1.0, "Technical Specification Group Core Network and Terminals, Non-Access-Stratum (NAS) protocol for Evolved Packet System (EPS), Stage 3 (Release 18)", Dec. 2022, pp. 1-620.

3rd Generation Partnership Project (3GPP), TS 24.301 V18.2.0, "Technical Specification Group Core Network and Terminals, Non-Access-Stratum (NAS) protocol for Evolved Packet System (EPS), Stage 3 (Release 18)", Mar. 2023, 622 pages.

3rd Generation Partnership Project (3GPP), TS 24.501 V18.1.0, "Technical Specification Group Core Network and Terminals, Non-Access-Stratum (NAS) protocol for 5G System (5GS), Stage 3, (Release 18)", Dec. 2022, pp. 1-1031.

3rd Generation Partnership Project (3GPP), TS 24.501 V18.2.0, "Technical Specification Group Core Network and Terminals, Non-Access-Stratum (NAS) protocol for 5G System (SGS), Stage 3, (Release 18)", Mar. 2023, pp. 1-1058.

3rd Generation Partnership Project (3GPP), TS 29.518 V17.7.0, "5G, 5G System, Access and Mobility Management Services, Stage 3", Oct. 2022, pp. 1-419.

3rd Generation Partnership Project (3GPP), TS 29.518 V18.0.0, "Technical Specification Group Core Network and Terminals, 5G System, Access and Mobility Management Services, Stage 3 (Release 18)", Dec. 2022, pp. 1-428.

* cited by examiner

UNAVAILABILITY PERIOD SUPPORT FOR MUSIM DEVICES

CROSS-REFERENCE TO RELATED APPLICATIONS

The application filed under 35 U.S.C. § 111 is a continuation of and claims the benefit, under 35 U.S.C. § 365, of Patent Cooperation Treaty Application No. PCT/US2024/022990, filed Apr. 4, 2024, which claims the benefit of U.S. Provisional Application 63/457,515, filed Apr. 6, 2023, the contents of which are incorporated by reference in their entirety herein.

BACKGROUND

Mobile communications using wireless communication continue to evolve. A fifth generation may be referred to as 5G. A previous (legacy) generation of mobile communication may be, for example, fourth generation (4G) long term evolution (LTE).

SUMMARY

Systems, methods, and instrumentalities are described herein related to unavailability period support while a wireless transmit/receive unit (WTRU) is registered on non-3GPP access (e.g., only on non-3GPP access).

A device (e.g., a WTRU, network device, such as a device comprising an access and mobility function (AMF)) may perform one or more of the following actions. The device may send a registration request (e.g., to a network entity), for example, via non-access stratus (NAS) signaling. The registration request may include a first duration (e.g., unavailability duration associated with a WTRU). The device may receive a registration accept message. The registration accept message may indicate whether the device is to inform the network entity when the WTRU is available (e.g., after an unavailability event/duration elapses). The device may determine that an unavailability event has ended. The WTRU may determine (e.g., based on the registration accept message) whether to inform the network entity that the WTRU is available. The device may send a registration update request. The registration update request may be sent based on a determination that the unavailability event has ended and a determination that the WTRU is to inform the network entity when the WTRU is available. The registration update request may indicate that the WTRU is available.

The device may receive an indication from the network, for example, that indicates congestion. The device may receive an indication that indicates a second duration (e.g., a back-off duration associated with congestion). The second duration may be determined. The first duration may be greater than or equal to the second duration.

The device may receive a registration request message (e.g., from a WTRU), that indicates a first duration (e.g., unavailability period associated with the WTRU). The registration request may be associated with unavailability information. The device may determine whether the WTRU is to send an update message (e.g., after the first duration). The device may send a registration accept message (e.g., to the WTRU). The device may send the registration accept message, for example, based on a determination that the registration request is associated with unavailability information. The registration accept message may indicate an acceptance associated with the registration request message. The registration accept message may indicate whether the WTRU is to send an update message after the first duration (e.g., based on whether the WTRU is associated with discontinuous coverage). The registration accept message may indicate to refrain from sending an update message (e.g., after the first duration), for example, if the WTRU is associated with discontinuous coverage. The device may determine whether the WTRU is available after the first duration. The device may determine whether an update message has been received from the WTRU (e.g., before the first duration has expired), for example, if the registration accept message indicates that the WTRU is to send an update message after the first duration. The WTRU may be determined to be available, for example, if the update message has been received before the first duration has expired. The device may send a rejection message, for example, associated with congestion. The rejection message may indicate a second duration. The first duration may be less than the second duration.

The device may be a multi-universal subscriber identity module (MUSIM) device. The device may send a first registration request to a first network. The first registration request may indicate to enable an unavailability period feature with the second network. The registration request may indicate a first unavailability duration associated with an unavailability period. The device may determine that an unavailability event is triggered. The device may determine that the device (e.g., WTRU) will be unavailable for a period of time. The determination that the device will be unavailable for the period of time may be based on the determination that the unavailability event is triggered. The first unavailability duration may be determined based on the determination that the device will be unavailable for the period of time. The device may receive a first registration response (e.g., from the first network). The first registration response may be a first registration accept message. The first registration response may indicate a first registration duration. The first registration duration may be greater than or equal to the first unavailability duration. The device may determine a second unavailability duration, for example, based on the first unavailability duration. The device may send a second registration request to a second network. The second registration request may indicate to enable the unavailability period feature with the second network. The second registration request may indicate the second unavailability duration. The device may receive a second registration response from the second network. The second registration response may be a second registration accept message. The second registration response may indicate a second registration duration. The second registration duration may be greater than or equal to the second unavailability duration. The second unavailability duration may be greater than or equal to the first registration duration.

A device may perform actions associated with dual registration. The device may receive a registration request (e.g., from a WTRU). The registration request may indicate unavailability period information. The registration request may include an unavailability period information element that may indicate the unavailability period information. The unavailability period information may indicate an unavailability duration, for example, associated with the WTRU. The device may send a notification to an entity (e.g., mobility management entity). The notification may indicate that the WTRU is unavailable for a period of time. The device may receive (e.g., from the entity) a notification response. The notification response may indicate an indication that the entity has accepted the unavailability of the WTRU. The notification response may indicate a tracking area update time duration. The notification response may indicate an indication that the entity has accepted the unavailability of the WTRU and a tracking area update time duration. The device may send a registration accept message (e.g., to the WTRU), for example, based on the notification response. The registration accept message may indicate the tracking area update time duration. The registration accept message may indicate to the WTRU to perform a tracking area update with the entity, for example, based on an unavailability event being completed.

The device may perform actions associated with non-3GPP access. The device may receive a registration request (e.g., from a WTRU). The registration request may indicate a first duration. The first duration may be an unavailability period. The registration request may include an information element, for example, that indicates the first duration. The registration request may be sent via a non-3GPP access network. The device may send a registration response, for example, that indicates that the first duration was accepted. The indication of the acceptance of the first duration may indicate an accepted unavailability period duration. The accepted unavailability period duration may be equal to or greater than the requested first duration. The registration response may be sent based on the reception of the registration request via the non-3GPP access network and the registration request indicating the first duration. The device may determine that the WTRU is unreachable, for example, based on a determination that a second duration has elapsed. The second duration may be associated with or equal to an unavailability period duration associated with the registration request. The device may send a loss of connectivity repost. The loss of connectivity report may indicate an unavailability period. The loss of connectivity report may indicate that the unavailability period is sent to a network exposure function. The device may receive an NAS message from the WTRU. The device may perform one or more of the following, for example, based on received the NAS message: stop a tracking associated with the second duration; determine that the WTRU is reachable; determine that the WTRU is in a CONNECTED state; etc. The device may de-register the WTRU based on a determination that the second duration has expired.

DETAILED DESCRIPTION

Figure 1A:
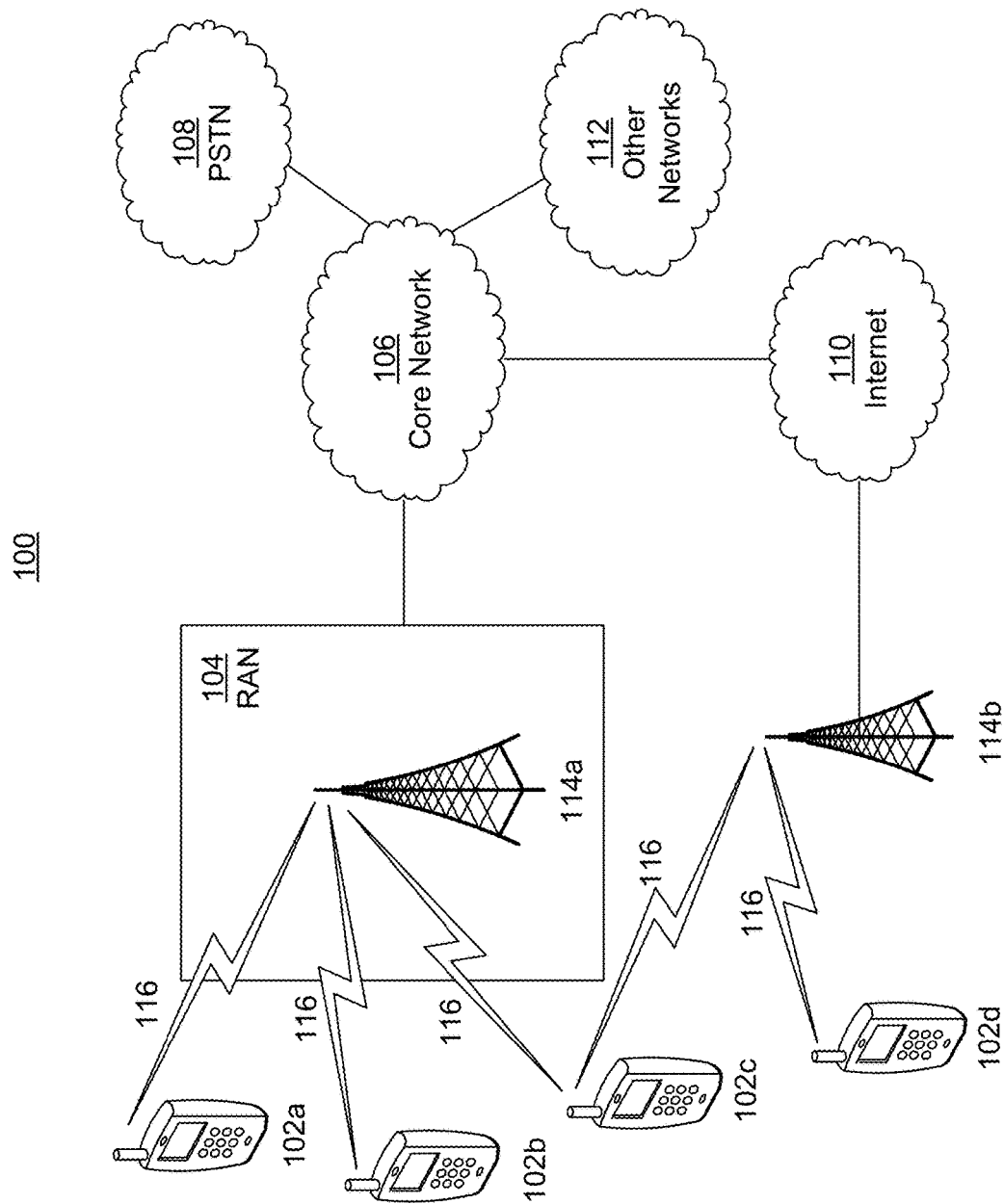
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
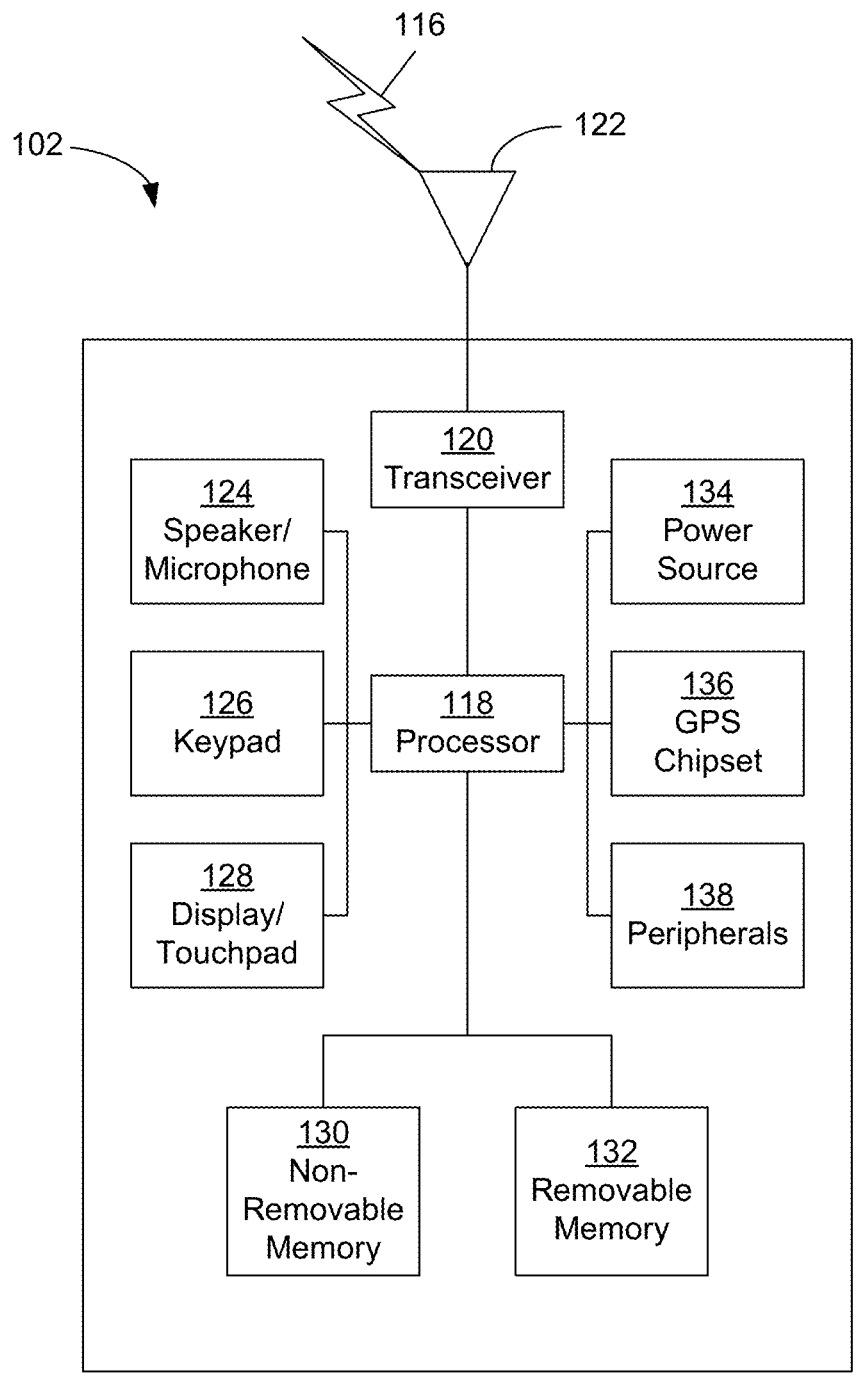
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception).

Figure 1C:
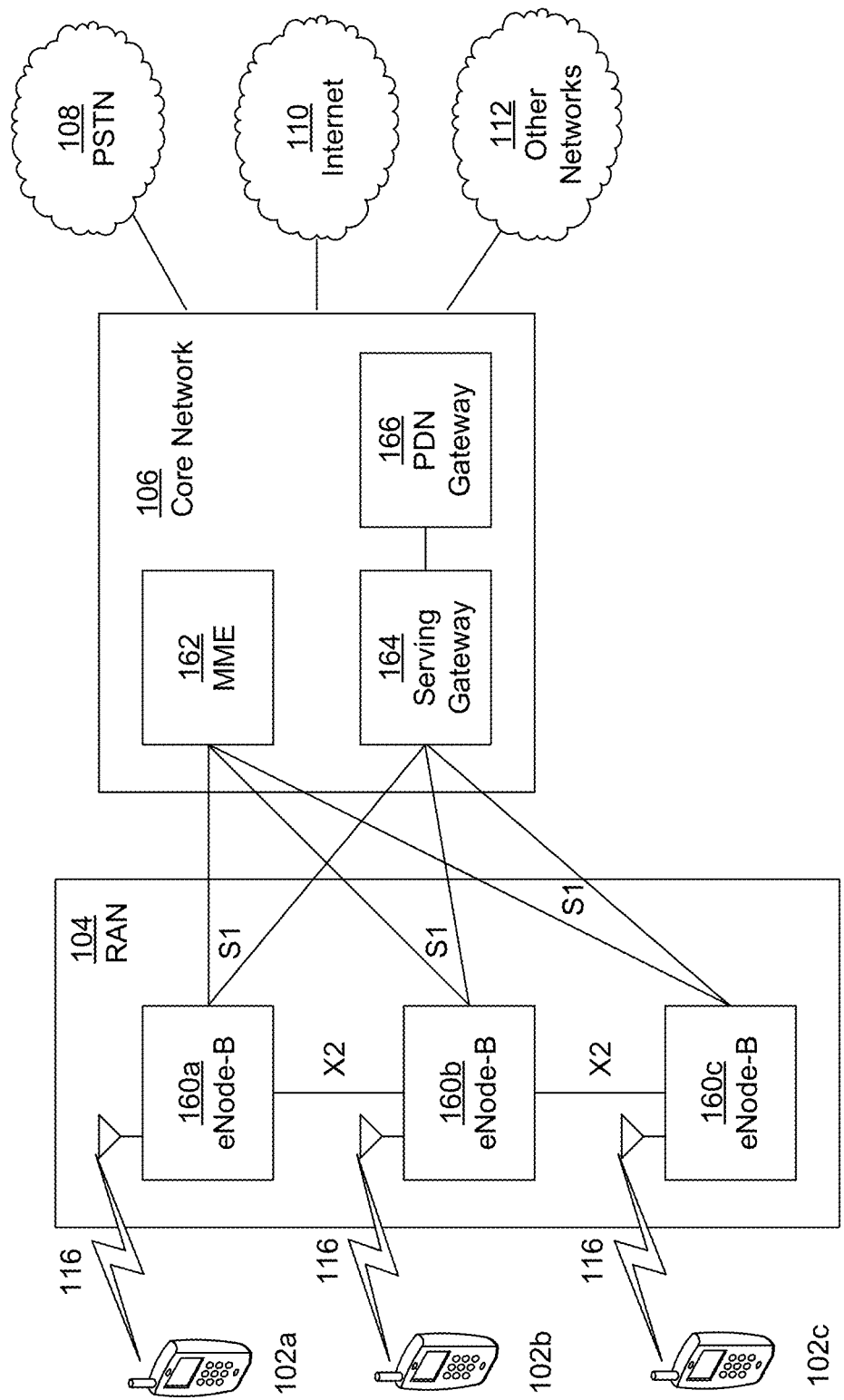
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
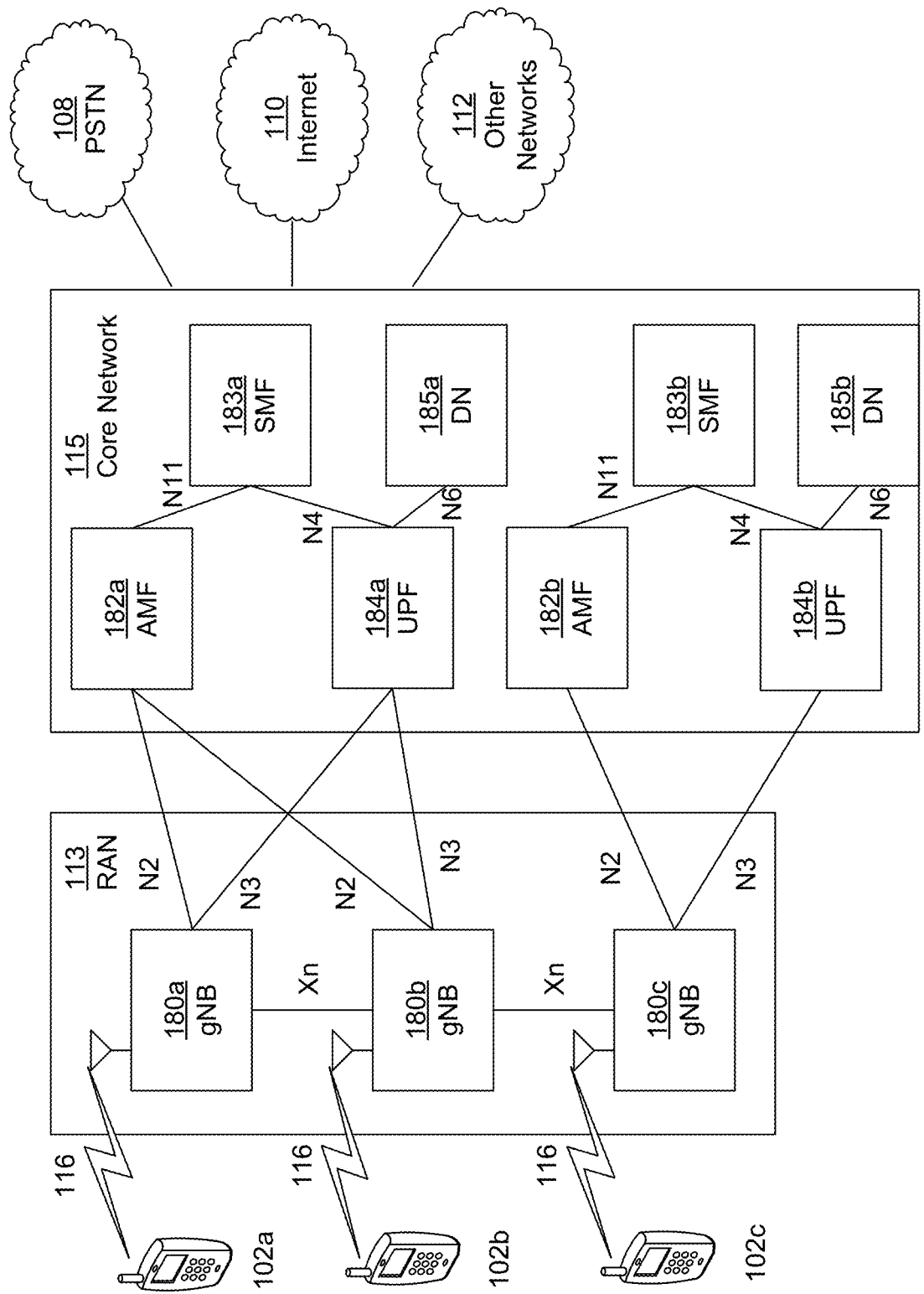
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be testing equipment. Direct RF coupling and/or wireless communications via RF circuitry (e.g., which may include one or more antennas) may be used by the emulation devices to transmit and/or receive data.

Reference to a timer herein may refer to determination of a time or determination of a period of time. Reference to a timer expiration herein may refer to determining that the time has occurred or that the period of time has expired. Reference to a timer herein may refer to a time, a time period, tracking the time, tracking the period of time, etc. Reference to a legacy technology or legacy handover may indicate a legacy technology such as LTE compared to NR, or a legacy version of a technology, for example, an earlier version/release of a technology (e.g., earlier NR release) compared to a later version/release of the technology (e.g., later NR release). Reference to a specific timer herein may be provided as an example of a timer.

Systems, methods, and instrumentalities are described herein related to unavailability period support while a wireless transmit/receive unit (WTRU) is registered on non-3GPP access (e.g., only on non-3GPP access).

A device (e.g., a WTRU, network device, such as a device comprising an access and mobility function (AMF)) may perform one or more of the following actions. The device may send a registration request (e.g., to a network entity), for example, via non-access stratus (NAS) signaling. The registration request may include a first duration (e.g., unavailability duration associated with a WTRU). The device may receive a registration accept message. The registration accept message may indicate whether the device is to inform the network entity when the WTRU is available (e.g., after an unavailability event/duration elapses). The device may determine that an unavailability event has ended. The WTRU may determine (e.g., based on the registration accept message) whether to inform the network entity that the WTRU is available. The device may send a registration update request. The registration update request may be sent based on a determination that the unavailability event has ended and a determination that the WTRU is to inform the network entity when the WTRU is available. The registration update request may indicate that the WTRU is available.

The device may receive an indication from the network, for example, that indicates congestion. The device may receive an indication that indicates a second duration (e.g., a back-off duration associated with congestion). The second duration may be determined. The first duration may be greater than or equal to the second duration.

The device may receive a registration request message (e.g., from a WTRU), that indicates a first duration (e.g., unavailability period associated with the WTRU). The registration request may be associated with unavailability information. The device may determine whether the WTRU is to send an update message (e.g., after the first duration). The device may send a registration accept message (e.g., to the WTRU). The device may send the registration accept message, for example, based on a determination that the registration request is associated with unavailability information. The registration accept message may indicate an acceptance associated with the registration request message. The registration accept message may indicate whether the WTRU is to send an update message after the first duration (e.g., based on whether the WTRU is associated with discontinuous coverage). The registration accept message may indicate to refrain from sending an update message (e.g., after the first duration), for example, if the WTRU is associated with discontinuous coverage. The device may determine whether the WTRU is available after the first duration. The device may determine whether an update message has been received from the WTRU (e.g., before the first duration has expired), for example, if the registration accept message indicates that the WTRU is to send an update message after the first duration. The WTRU may be determined to be available, for example, if the update message has been received before the first duration has expired. The device may send a rejection message, for example, associated with congestion. The rejection message may indicate a second duration. The first duration may be less than the second duration.

The device may be a multi-universal subscriber identity module (MUSIM) device. The device may send a first registration request to a first network. The first registration request may indicate to enable an unavailability period feature with the second network. The registration request may indicate a first unavailability duration associated with an unavailability period. The device may determine that an unavailability event is triggered. The device may determine that the device (e.g., WTRU) will be unavailable for a period of time. The determination that the device will be unavailable for the period of time may be based on the determination that the unavailability event is triggered. The first unavailability duration may be determined based on the determination that the device will be unavailable for the period of time. The device may receive a first registration response (e.g., from the first network). The first registration response may be a first registration accept message. The first registration response may indicate a first registration duration. The first registration duration may be greater than or equal to the first unavailability duration. The device may determine a second unavailability duration, for example, based on the first unavailability duration. The device may send a second registration request to a second network. The second registration request may indicate to enable the unavailability period feature with the second network. The second registration request may indicate the second unavailability duration. The device may receive a second registration response from the second network. The second registration response may be a second registration accept message. The second registration response may indicate a second registration duration. The second registration duration may be greater than or equal to the second unavailability duration. The second unavailability duration may be greater than or equal to the first registration duration.

A device may perform actions associated with dual registration. The device may receive a registration request (e.g., from a WTRU). The registration request may indicate unavailability period information. The registration request may include an unavailability period information element that may indicate the unavailability period information. The unavailability period information may indicate an unavailability duration, for example, associated with the WTRU. The device may send a notification to an entity (e.g., mobility management entity). The notification may indicate that the WTRU is unavailable for a period of time. The device may receive (e.g., from the entity) a notification response. The notification response may indicate an indication that the entity has accepted the unavailability of the WTRU. The notification response may indicate a tracking area update time duration. The notification response may indicate an indication that the entity has accepted the unavailability of the WTRU and a tracking area update time duration. The device may send a registration accept message (e.g., to the WTRU), for example, based on the notification response. The registration accept message may indicate the tracking area update time duration. The registration accept message may indicate to the WTRU to perform a tracking area update with the entity, for example, based on an unavailability event being completed.

The device may perform actions associated with non-3GPP access. The device may receive a registration request (e.g., from a WTRU). The registration request may indicate a first duration. The first duration may be an unavailability period. The registration request may include an information element, for example, that indicates the first duration. The registration request may be sent via a non-3GPP access network. The device may send a registration response, for example, that indicates that the first duration was accepted. The indication of the acceptance of the first duration may indicate an accepted unavailability period duration. The accepted unavailability period duration may be equal to or greater than the requested first duration. The registration response may be sent based on the reception of the registration request via the non-3GPP access network and the registration request indicating the first duration. The device may determine that the WTRU is unreachable, for example, based on a determination that a second duration has elapsed. The second duration may be associated with or equal to an unavailability period duration associated with the registration request. The device may send a loss of connectivity repost. The loss of connectivity report may indicate an unavailability period. The loss of connectivity report may indicate that the unavailability period is sent to a network exposure function. The device may receive an NAS message from the WTRU. The device may perform one or more of the following, for example, based on received the NAS message: stop a tracking associated with the second duration; determine that the WTRU is reachable; determine that the WTRU is in a CONNECTED state; etc. The device may de-register the WTRU based on a determination that the second duration has expired.

Systems, methods, and instrumentalities are described herein related to unavailability period support while a WTRU is registered on non-3GPP access (e.g., only on non-3GPP access).

A device (e.g., a network device, such as a device comprising an access and mobility function (AMF)) may (e.g., be configured to) perform one or more of the following actions. The device may receive a registration request. The registration request may include unavailability information (e.g., an unavailability period duration information element (IE)), for example, which may be sent over a non-3GPP access network. The device may (e.g., based on receiving the registration request via a non-3GPP access network and/or based on the request including the unavailability period duration information element) determine to start tracking a duration (e.g., start a wait-timer). The device may assign the duration (e.g., wait-timer) an initial value, for example, which may be equal to the unavailability period duration that was provided in the registration request. The device may (e.g., based on receiving the registration request via a non-3GPP access network and/or based on the request including the unavailability period duration information element) determine to send a registration response, for example, which may include an indication that the unavailability period duration request was accepted and that the network. The device may indicate acceptance of the unavailability period duration, for example, by sending an accepted unavailability period duration to a wireless transmit/receive unit (WTRU). The device may assign an accepted unavailability period duration that is equal to or greater than the requested unavailability period duration. The device may (e.g., based on receiving the registration request via a non-3GPP access network and/or based on the request including the unavailability period duration information element) determine to consider the WTRU unreachable and in an idle state (e.g., a 5GMM-IDLE state). The device may (e.g., based on the WTRU being unreachable and in the idle state (e.g., 5GMM-IDLE state)) send an indication to a session management function (SMF) that the WTRU is unreachable. The indication may be sent in response to a downlink data notification from the SMF. The device may trigger a loss of connectivity event report (e.g., which may include an unavailability period) towards a network exposure function (NEF), and/or the unavailability period may be reported to the subscribed AF, for example, if there is a loss of connectivity event subscription for the WTRU by an application function (AF). The device may receive an initial non-access stratum (NAS) message from the WTRU. The device may (e.g., based on receiving the NAS initial NAS message) determine to stop tracking the duration (e.g., stop the wait-timer), consider the WTRU reachable and in a connected state (e.g., a 5GMM-CONNECTED state). The device may (e.g., alternatively), based on the duration expiring (e.g., wait-timer expiring) determine to (e.g., implicitly) de-register the WTRU.

An example device may include a processor configured to perform one or more actions. For example, a device (e.g., a network device, such as a device comprising an AMF) may receive a registration request from a wireless transmit/receive unit (WTRU). The registration request may comprise unavailability information (e.g., an unavailability period duration information element). The registration request may be sent over a non-3GPP access network. The device may start tracking a duration (e.g., start a timer). The device may send a registration response. The registration response may comprise an indication that the unavailability period duration request was accepted. The device may determine that the WTRU is unreachable. The device may send a loss of connectivity report.

A value of the duration (e.g., timer) may be associated with or equal to an unavailability period duration associated with the registration request. The registration response may be sent based on the reception of the registration request via the non-3GPP access network and the registration request comprising the unavailability period duration information element. The indication of the acceptance of the unavailability period duration request may indicate an accepted unavailability period duration. The accepted unavailability period duration may be equal to or greater than the requested unavailability period duration. The loss of connectivity report may indicate an unavailability period. The loss of connectivity report that indicates the unavailability period may be sent to a network exposure function. The device (e.g., the processor) may be further configured to receive a NAS message from the WTRU and (e.g., based on receiving the NAS message) perform one or more of: stop tracking the duration (e.g., stop the timer), determine that the WTRU is reachable, or determine that the WTRU is in a CONNECTED state. The device (e.g., the processor) may be further configured to implicitly de-register the WTRU based on the timer expiring.

Systems, methods, and instrumentalities are described herein related to mechanisms for providing an unavailability period to a network. Some events, such as an operating system (OS) upgrade, a silent reset at a modem or modem software updates (e.g., also called binary updates) may be executed with more than two (e.g., three (3) parties involved, e.g., the device, the operator, and the application function.

A WTRU executing a multi-party event may become unavailable (e.g., cannot interact with the 5G System), for example, (e.g., on the order of minutes) while event operations are performed. WTRU unavailability without prior knowledge from the core network and/or application function may impact (e.g., critical) operations of an application server, e.g., if the application server depends on the availability of the WTRU during the unavailability period (e.g., a period of time during which the WTRU is not available).

Systems, methods, and instrumentalities are described herein related to handling an unavailability period for one or more scenarios, such as when a back-off duration is active (e.g., timer is running), if (e.g., when) a WTRU is registered to a network (e.g., 5GS) via (e.g., only) non-3GPP access, if (e.g., when) a multi-universal subscriber identity module (MUSIM) device is registered with multiple networks with and without support for an unavailability feature, if (e.g., when) a WTRU is registered to multiple networks (e.g., both evolved packet system (EPS) and fifth generation system (5GS)), for support of analytics (e.g., network data analytics function (NWDAF)) for the unavailability feature, if (e.g., when) a Remote WTRU and/or a Relay WTRU enters the unavailability period, if (e.g., when) a mobile initiated connection only (MICO) Mode and/or the Strictly Periodic Registration Timer feature is enabled, etc.

An unavailability period may be a duration for which a WTRU is unavailable, for example, may not interact with a network (e.g., the 5G System). An unavailability period may be, for example, on the order of minutes. An unavailability period for a WTRU may be (e.g., expected to be) sufficiently long for the WTRU to execute (e.g., required) events, such as one or more of the following: (a) silent reset at the modem; (b) security patch updates; (c) OS upgrade; (d) modem software (SW) updates; and/or (e) device reboot upon modem setting changes (e.g., via Open Mobile Alliance Device Management (OMA-DM).

Seamless WTRU context recovery may be performed. Certain events, for example, an OS upgrade, a silent reset at the modem, or modem software updates (e.g., also called binary updates) may be executed with multiple (e.g., three (3) parties involved, e.g., the device, the operator and the application function.

A WTRU may download a binary. The time when the WTRU performs the upgrade is left for WTRU implementation. Some WTRU implementations may use (e.g., seek) user input. The WTRU may delay execution of the event, for example, if a WTRU may not execute the event (e.g., because the storage capacity or the battery level are insufficient). The WTRU may become unavailable (e.g., may not interact with the 5G System), for example, (e.g., on the order of minutes) if (e.g., when) such operations are performed. WTRUs may become unavailable without prior knowledge from the core network and/or application function. WTRU unavailability may impact critical operations of an application server, for example, if the application server depends on the availability of the WTRU during the unavailability period (e.g., a period of time during which the WTRU is not available).

A network (e.g., the 5G System) may allow for a WTRU to provide an unavailability period (e.g., unavailability duration) to the network, e.g., in a registration request or a de-registration request. The WTRU may store its mobility management (MM) and session management (SM) contexts in the universal subscriber identity module (USIM) or Non-Volatile memory to be able to reuse the MM and SM contexts after the WTRU's unavailability period, for example, if an event is triggered in the WTRU that would make the WTRU unavailable for a certain period of time. The WTRU may trigger a Mobility Registration Update procedure or De-Registration procedure and provide the Unavailability Period Duration to the network, for example, if the WTRU may store the WTRU's contexts. The network (e.g., the access and mobility function (AMF) may take the Unavailability Period Duration into account, for example, if (e.g., when) determining a Periodic Registration Update duration (e.g., Periodic Registration Update timer value). The AMF may provide a Periodic Registration Update time longer than or equal to the Unavailability Period Duration, for example, to avoid interfering with the WTRU dealing with the event that causes the unavailability. Later (e.g., once the event which makes the WTRU unavailable is completed in the WTRU or the event is delayed to a future time or canceled in the WTRU), the WTRU may trigger the Registration procedure to resume regular service. The WTRU may refrain from including (e.g., not include) the Unavailability Period in the Registration Request message. Depending on the WTRU state, the Registration procedure may be an Initial Registration procedure or Mobility Registration Update procedure.

The AMF may provide a Strictly Periodic Registration duration indication (e.g., strictly periodic registration timer indication) to the WTRU, e.g., together with the periodic registration timer value. The periodic registration timer feature may be applied, for example, if (e.g., when) the WTRU uses a MICO mode. The AMF may provide the indication to the WTRU based on expected WTRU behavior. For example, the AMF may (e.g., want to) configure the WTRU to be available for downlink data (e.g., in CM-CONNECTED mode) every hour (e.g., on the hour) in order to receive downlink data. The periodic registration duration (e.g., timer) feature may be useful, for example, if (e.g., when) the WTRU uses MICO Mode. The periodic registration duration (e.g., timer) feature may be used to ensure that the WTRU is on CM-CONNECTED mode (e.g., at predictable times). For example, if the WTRU runs a strictly periodic registration timer of 4 hours and (e.g., always) applies an active timer of 10 minutes, then it may be known that the WTRU is available every 4 hours for 10 minutes. By enabling the Strictly Periodic Registration duration (e.g., Timer) feature, the AMF may configure the availability events (e.g., 10-minute availability events) to occur at predictable times.

A Network Data Analytics Function (NWDAF) may interact with other network functions to collect data. The data that is collected by the NWDAF may be used by the NWDAF to determine analytics information. Analytics information may include statistics and predictions.

The AMF may be an example of a network function (NF) from which the NWDAF may collect data. The NWDAF may use the AMF's Namf_EventExposure service to obtain data from the AMF. The NWDAF may provide an Nnwdaf_AnalyticsInfo service that may be used by network functions to obtain statistics and predictions from the NWDAF. The policy control function (PCF), access and mobility management function (AMF), network slicing selection function (NSSF), network exposure function (NEF), session management function (SMF), and application function (AF) are examples of network functions that may invoke or consume the Nnwdaf_AnalyticsInfo service.

The following items may include examples of information that may be sent to an NF that invokes, or consumes, the Nnwdaf_AnalyticsInfo service: First Network Slice Instance load level statistics and predictions; Second Network Slice load level statistics and predictions; Third Network Function load level statistics and predictions; Fourth Network load level statistics and predictions; Fifth WTRU communication statistics and predictions; and Sixth WTRU abnormal behavior statistics and predictions.

Predictions and statistics provided by the NWDAF to network functions may be based, at least in part, on information that is collected from other network functions, such as the AMF.

An unavailability period may be determined in 5GS for a WTRU (e.g., specific WTRU). WTRU and/or network actions may be based on a determined unavailability period. A WTRU and a network (e.g., 5GC) may coordinate about the unavailability period and/or the architecture level workflow of the unavailability feature.

A WTRU may provide an indication of support of an Unavailability Period, for example, in a Registration Request message (e.g., during a registration procedure). The AMF may indicate the support of the Unavailability Period, for example, in a Registration Accept message.

The WTRU may store its MM context in the USIM or Non Volatile memory to be able to reuse the MM context (e.g., after the WTRU's unavailability period), for example, if a WTRU and a network support an Unavailability Period and an event is triggered in the WTRU that would make the WTRU unavailable for a certain period of time (e.g., for OS upgrade or device reboot). The WTRU may trigger mobility registration or a deregistration procedure including the unavailability period, for example, if (e.g., when) the WTRU is ready to execute the event. The AMF may provide a Periodic Registration Update duration (e.g., timer) based on the unavailability period indicated by the WTRU, e.g., the AMF may provide a Periodic Registration Update time larger than the unavailability period. The AMF may store the information that the WTRU is unavailable in WTRU context, for example, if the WTRU is not deregistered. The AMF may consider the WTRU as unreachable until the unavailability period has passed or the WTRU enters CM-CONNECTED state. While the WTRU is unreachable, (e.g., all) high latency communication solutions may apply (e.g., if supported), such as extended data buffering, downlink data buffering status report, etc. If there is a Loss of Connectivity event subscription for the WTRU by AF, the AMF may trigger a Loss of Connectivity event report, which may include an unavailability period towards the NEF. The unavailability period may be reported to the respective subscribed AF.

The WTRU may (e.g., choose to) store the WTRU contexts (e.g., MM and SM contexts), for example, if (e.g., when) a WTRU is ready to execute an event (e.g., for OS upgrade or device reboot). How the WTRU stores the context may depend upon the WTRU implementation. The WTRU may store some or all of the WTRU contexts in the USIM using USIM functionality.

The WTRU may trigger a registration procedure to resume regular service, for example, once the event that makes the WTRU unavailable is completed in the WTRU or the event is delayed to a future time or canceled in the WTRU (e.g., due to insufficient storage capacity, insufficient battery level, or the event that makes the WTRU unavailable is completed). The WTRU may refrain from including (e.g., not include) the Unavailability Period in the Registration Request message. The registration procedure may be an Initial Registration procedure or Mobility Registration Update procedure, for example, depending on the state the WTRU ends up after the event.

Unavailability period support may be provided while back-off durations are active (e.g., timers are running). While non-access stratum (NAS) back-off durations (e.g., timers, or other back-off timers) are running in the WTRU (e.g., T3346/T3347/T3396, other back-off timers), the mobility management entity of the NAS layer may refrain from triggering (e.g., not trigger or not be allowed to) trigger a mobility registration procedure towards the core network (e.g., excluding one or more exceptions, such as downlink (DL) paging/NOTIFICATION, UL high priority signaling or emergency services). A WTRU (e.g., in this case) may refrain from sending (e.g., not send) a registration request to the network with an unavailability period duration.

The network may try to contact (e.g., unsuccessfully contact) the WTRU for mobile terminated services while the back-off duration (e.g., timer) is running, for example, if a WTRU were to refrain from sending (e.g., not send) an unavailability period duration to the network and perform the actions that may cause the WTRU to become unavailable while the backoff duration (e.g., timer) is running. The attempt to contact the WTRU for mobile terminated services may fail.

One or more examples described herein may indicate how a WTRU handles MM signaling when the MM backoff duration (e.g., timer) is running and the WTRU may (e.g., need to) execute an event that would make the WTRU unavailable.

Unavailability period support may be provided while the WTRU is registered on non-3GPP access and no other access (e.g., registered only on non-3GPP access). The WTRU may send an initial NAS message to establish the N1 NAS signaling connection to the AMF, for example, if the NAS layer of a WTRU receives a notification from lower layers that non-3GPP access is available. The NAS may (e.g., then) consider the WTRU to be on the 5GMM-CONNECTED mode over non-3GPP access. The WTRU may (e.g., then) be reachable for mobile terminated communication from the network. For example, the WTRU may receive an NAS Notification message from the network that indicates that downlink data is available for the WTRU. A WTRU in 5GMM-CONNECTED mode over non-3GPP access may (e.g., generally) stay in 5GMM-CONNECTED mode, e.g., unless the WTRU disconnects from the non-3GPP network.

The periodic registration update procedure may be refrained from being performed (e.g., may not be performed), for example, if (e.g., when) the WTRU is registered over non-3GPP access.

A WTRU that is registered over non-3GPP access may indicate an unavailability period to the network, for example, so that the network and WTRU may maintain the WTRU's registration state and/or so that the network understands that the WTRU may be not reachable for mobile terminated communication.

Unavailability period support may be provided for MUSIM devices. One or more examples described herein may indicate how an unavailability feature may be handled for MUSIM devices registered to two (2) or more different networks.

In some examples, multiple (e.g., both) networks may support the unavailability feature. In some examples, both networks may be provided with an (e.g., the same) unavailability period duration. In some examples, an unavailability duration may be determined based on an outcome from the first network. In some examples, at least one of the networks may not support the unavailability feature.

A MUSIM WTRU may be registered to multiple networks. NAS signaling procedures may be carried out (e.g., only) sequentially. There may be an element of delay (e.g., that may be accounted for) while communicating with the network about the unavailability period. The reporting of the unavailability to the networks sequentially may be taken into account while coming out of unavailability, for example, to ensure that the networks are informed within the stipulated time frames.

One or more examples described herein may indicate how a MUSIM WTRU with a different configuration (e.g., all networks support unavailability feature, or one or more of the networks do not support unavailability feature) may indicate an unavailability period to the network(s), e.g., so that the network(s) and MUSIM WTRU can maintain the MUSIM WTRU's registration state and/or so that the network understands that the WTRU is not reachable for mobile terminated communication.

Unavailability period support may be provided for devices registered to multiple networks (e.g., both EPC and 5GC). A WTRU (e.g., capable of operating in S1 and N1 modes) may be registered to both the EPS and 5GS. A WTRU that is registered to EPS may be said to be in S1 mode. A WTRU that is registered to the 5GS may be said to be in N1 mode. A WTRU that is dual-registered may be in both S1 and N1 modes (e.g., simultaneously).

One of multiple networks (e.g., EPS) may not support negotiation of an unavailability period, e.g., over the S1 NAS interface between the WTRU and the mobility management entity (MME) of the EPS. One or more examples described herein may indicate how the EPS knows (e.g., determines) to refrain from deleting (e.g., not delete) the WTRU's context and/or knows (e.g., determines) to refrain from attempting to contact (e.g., not attempt to contact) the WTRU for mobile terminated communication if (e.g., when) the WTRU is executing the event that makes it temporarily unavailable.

Analytics (e.g., NWDAF) may be supported for the unavailability period feature. As described herein, an NWDAF may provide statistics and/or predictions to other network functions. As described herein, a WTRU may indicate to the AMF that the WTRU may be unavailable for a period of time, for example, by sending an unavailability period duration in a registration request or by providing an unavailability period duration in a de-registration request.

There may be several scenarios to consider. First, an unavailability period provided by a WTRU to the AMF may not be a common event. For example, an unavailability period may occur (e.g., only) if (e.g., when) the WTRU is installing a software upgrade. Second, multiple (e.g., many) WTRUs in an area may install a software upgrade at the same or similar time. Multiple WTRUs may become unavailable and available again at approximately the same time. Third, an unavailability period provided by a WTRU may be a strong indication of when the WTRU may attempt to perform a registration procedure with the network (e.g., it may be anticipated that the WTRU may attempt to register with the network within the unavailability period duration).

The unavailability period durations requested by WTRUs may have a strong influence on future events that may take place in the network. The unavailability period durations requested by WTRUs may influence the accuracy of statistics and predictions provided by the NWDAF to other network functions. The NWDAF may obtain unavailability period durations and/or may consider unavailability period durations when generating statistics and predictions (e.g., using one or more features described herein).

Unavailability period feature support may be provided for relay WTRUs. One or more examples described herein may indicate how to handle the scenario for the relay WTRUs, handling of the unavailability event for the Relay WTRU and Remote WTRUs, and/or how coordination may be maintained between the connected relay WTRU and remote WTRUs.

A WTRU may be configured (e.g., by the network) to use a (e.g., strictly periodic) registration duration (e.g., timer) feature. As described above, a strictly periodic registration timer feature may be configured so that a WTRU is in CM-CONNECTED mode and available to receive downlink data at predictable times. This feature may be useful for devices that use a MICO mode and/or enter long sleep durations, e.g., in order to save power. The occasions where these devices (e.g., WTRUs) are available for downlink data may be very infrequent (e.g., hours or even days apart). If the WTRU requests an unavailability period that would overlap with when the WTRU is expected to be available for downlink data, it may cause the WTRU to miss downlink data that may be sent from a server that anticipated that the WTRU would be available at the expected time.

Multiple parties (e.g., three parties) may be involved to execute certain events (e.g., operations), such as an OS upgrade, a silent reset at a modem, or modem software updates (e.g., also called binary updates). The multiple parties involved may include, for example, the device (e.g., WTRU), the operator, and the application function.

A WTRU may become unavailable (e.g., may not interact with the 5G System), for example, on the order of minutes, whenever such operations are performed. WTRUs may become unavailable without prior knowledge from the core network and/or application function. Unexpected WTRU unavailability may impact operations (e.g., critical operations) of an application server, e.g., if the application server depends on availability of the WTRU during the unavailability period (e.g., a period of time during which the WTRU is not available).

Systems, methods, and instrumentalities are described herein related to handling of the unavailability period feature for multiple scenarios, such as if (e.g., when) a back-off duration (e.g., timer) may be running, if (e.g., when) the WTRU may be registered to a network (e.g., 5GS) via (e.g., only) non-3GPP access, if (e.g., when) a MUSIM device may be registered with multiple networks with and without support for the unavailability feature, if (e.g., when) the WTRU is registered to multiple networks (e.g., both EPS and 5GS), for support of analytics (e.g., NWDAF) for the unavailability feature, if (e.g., when) Remote WTRU and/or Relay WTRU enter an unavailability period, if (e.g., when) MICO Mode and/or the Strictly Periodic Registration duration (e.g., timer) feature is enabled, etc.

Unavailability period support may be provided while back-off durations (e.g., timers) are running. The AMF may, for example, upon detection of mobility management (e.g., 5GMM) signaling congestion, perform (e.g., general) NAS level congestion control. The WTRU (e.g., under the 5GMM signaling congestion conditions) may refrain from sending (e.g., not send, not be allowed to send) a mobility registration update message, e.g., except for one or more scenarios, such as emergency and/or high priority services.

The AMF may (e.g., if/when general NAS level congestion control is active) reject an NAS message and include a value for the mobility management (MM) back-off duration (e.g., timer, e.g., T3346) in the reject messages. The WTRU may start tracking a duration (e.g., the timer, e.g., T3346) with the value received in the MM (e.g., 5GMM) reject messages. The WTRU may refrain from (e.g., be barred from) sending one or more (e.g., certain) NAS messages (e.g., a Mobility Registration Update), for example, if (e.g., when) the back-off duration (e.g., timer) is running. The WTRU may respond to network-initiated signaling (e.g., a page that was triggered by downlink data), for example, if (e.g., when) the back-off duration (e.g., timer) is running.

A WTRU may inform the network about the start of an unavailability period, for example, based on (e.g., upon) detection of an event in the WTRU that may (e.g., would) make the WTRU unavailable for a (e.g., certain) period of time. The WTRU may inform the network about the start of the unavailability period via the REGISTRATION REQUEST message (e.g., including unavailability period IE), for example, if the WTRU is able to save the MM (e.g., 5GMM) context and SM (e.g., 5GSM) context. However, the WTRU may refrain from informing (e.g., not information, not be able to inform) the network (e.g., AMF) about the WTRU's unavailability in one or more scenarios. For example, the WTRU may refrain from triggering (e.g., not be allowed to trigger) UL NAS signaling to send the Mobility Registration Update if (e.g., when) the NAS level congestion control is active.

A WTRU may refrain from performing (e.g., not perform) an action that would make the WTRU unavailable without informing the network. The network may initiate signaling for the WTRU and find that the WTRU is unresponsive, for example, if the network is not informed. The WTRU may be unresponsive, for example, because the WTRU may be performing the action that makes it unavailable (e.g., a software upgrade).

A WTRU may (e.g., be allowed to) send a Mobility Registration Update to the network, for example, if (e.g., even when) the back-off duration (e.g., timer) is running. The WTRU may generate NAS signaling to inform the network about the unavailability period and then again to inform the network that the WTRU is available again. The signaling may be generated while the back-off duration (e.g., timer) is running. In some examples, multiple WTRUs in the same area may be performing the same software upgrade. The signaling of unavailability and availability from multiple WTRUs might trigger a significant amount of NAS signaling to be handled by the network, e.g., even during a congestion situation.

A WTRU may (e.g., be allowed to) send a REGISTRATION REQUEST message (e.g., including the unavailability period IE) while the NAS level congestion control is active (e.g., while a duration or timer is running, for example, while T3346 is running). The WTRU may (e.g., be configured to) prevent or avoid (e.g., restricted to ensuring that the REGISTRATION REQUEST message does not include) follow-on requests, uplink data status IE, and/or allowed PDU session status IE. The WTRU may (e.g., also) be configured (e.g., restricted) to (e.g., only) request an Unavailability Period Duration that is greater than or equal to the amount of time that is left on the NAS back-off duration (e.g., timer, e.g., T3346).

The AMF (e.g., based on receiving a Registration Request that includes an Unavailability Periodic Request while the back-off timer is running) may respond to the WTRU with information including, for example, one or more of the following (e.g., indicated in a Registration Accept message): (i) an indication that the Registration and Unavailability Period is Accepted; (ii) an indication that the previously provided back-off duration (e.g., timer, e.g., T3346) may continue to run and not be reset, e.g., indicating to the WTRU that the WTRU may still consider NAS level congestion control to be active; (iii) a new back-off duration (e.g., timer) value (e.g., T3346) to indicate to the WTRU that the WTRU may still consider NAS level congestion control to be active; (iv) an indication that the WTRU may inform the AMF when the WTRU becomes available again, for example, even if the back-off duration (e.g., timer) is running (e.g., T3346); and/or (v) an indication that the WTRU may NOT inform the AMF when the WTRU becomes available again if the back-off duration (e.g., timer) is running (e.g., T3346).

Figure 2:
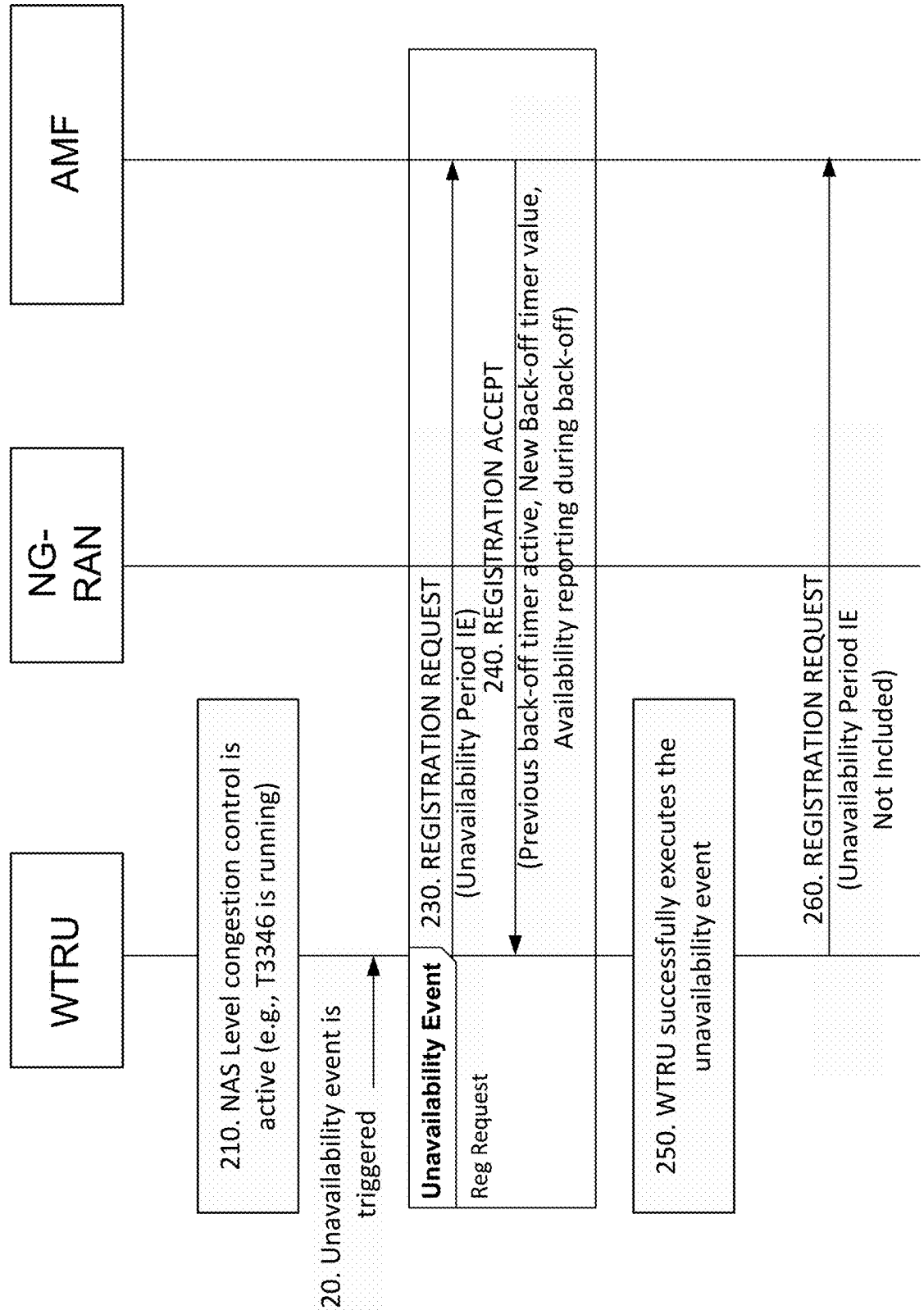
FIG. 2 illustrates an example of an unavailability event while NAS level congestion control is active.

The foregoing example indications in a Registration Accept message may give the AMF control over whether the WTRU generates additional signaling when the WTRU becomes available again. FIG. 2 shows an example procedure for the WTRU to signal an unavailability period and for the AMF to (e.g., still) limit the amount of NAS signaling.

FIG. 2 illustrates an example of an unavailability event while NAS level congestion control may be active. As shown in FIG. 2, at 210, NAS level congestion control may be active for the WTRU, for example, because the WTRU received a rejection response from the AMF. The rejection response may have included a duration (e.g., timer, e.g., T3346 timer). NAS level congestion control may be active in the WTRU. The duration (e.g., or other durations) may be running (e.g., T3346 and/or other back-off timer(s) may be running). The WTRU may refrain from triggering (e.g., not trigger, may not be allowed to trigger) NAS level signaling, e.g., except for cases meant for high priority access, emergency services, and/or the WTRU is responding to paging from the network side.

At 220 in FIG. 2, the WTRU may detect a need to execute an event in the WTRU that may make the WTRU unavailable for a certain period of time. The WTRU may (e.g., also) detect the amount of time that the WTRU is expected to be available. For example, the time value may be provided by an application or the Operating System.

At 230 in FIG. 2, the WTRU may trigger the REGISTRATION REQUEST procedure toward the AMF. The WTRU may provide the unavailability period IE to inform the network about the WTRU's unavailability duration. The WTRU (e.g., if the back-off timer is running in the WTRU) may (e.g., determine to) set the unavailability period to the duration that was determined at 220, for example, if the duration is greater than the amount of time that is left on the back-off duration (e.g., a timer, such as T3346). The WTRU may, otherwise, (e.g., determine to) request a time that is greater than or equal to the amount of time that is left on the back-off duration (e.g., timer).

At 240 in FIG. 2, the AMF may take into consideration the presence of the unavailability period IE, refrain from rejecting (e.g., not reject) the registration request, and/or respond with the REGISTRATION ACCEPT message. The AMF may (e.g., also) use the REGISTRATION ACCEPT message to indicate that the previously provided back-off duration (e.g., timer, e.g., T3346) may continue to run and not be reset, to provide a new back-off duration (e.g., timer) value (e.g., T3346) to indicate to the WTRU that the WTRU may still consider NAS level congestion control to be active, and/or to provide an indication of whether the WTRU may inform the AMF when the WTRU becomes available again, e.g., even if the back-off duration (e.g., timer) is running.

At 250 in FIG. 2, the WTRU may (e.g., successfully) execute the event that made the WTRU unavailable, e.g., Silent reset at Modem, Security patch updates, OS upgrade, Modem SW updates, and/or Device reboot upon Modem setting changes via OMA-DM.

At 260 in FIG. 2, the WTRU may inform the AMF about the WTRU's (e.g., successful) execution of the unavailability event, for example, if the back off duration (e.g., timer) is no longer running or if the AMF indicated at 240 that the WTRU may inform the AMF when the WTRU becomes available again (e.g., even if the back-off timer is running). The WTRU may inform the AMF about the WTRU's (e.g., successful) execution of the unavailability event, for example, by sending the REGISTRATION REQUEST message, for example, refraining from including (e.g., without including) the unavailability period IE. The WTRU may wait until the back-off duration (e.g., timer) expires and then inform the AMF about the WTRU's (e.g., successful) execution of the unavailability event, for example, if the back-off duration (e.g., timer) is running or if the AMF indicated at 240 that the WTRU may refrain from informing (e.g., not inform) the AMF when the WTRU becomes available again if the back-off duration (e.g., timer) is running. The WTRU may wait until the back-off duration (e.g., timer) expires and then inform the AMF about the WTRU's (e.g., successful) execution of the unavailability event, for example, by sending the REGISTRATION REQUEST message, for example, refraining from including (e.g., without including) the unavailability period IE.

With reference to FIG. 2, a further example procedure is provided for the case where a back-off duration (e.g., timer) is running. A WTRU may perform one or more of the following.

As shown in FIG. 2, at 210, the WTRU may receive an NAS Reject message that indicates the WTRU is restricted because of a congestion situation in the network. The NAS rejection message may include a duration (e.g., timer value) that indicates how long the WTRU may consider the congestion situation to be applicable and/or how long the restriction is applicable. The WTRU may start tracking a back-off duration (e.g., a back-off timer), for example, based on receiving the duration (e.g., timer value).

As shown in FIG. 2, at 220, the WTRU may detect a need to execute an event in the WTRU that may make the WTRU unavailable for a (e.g., certain) period of time. The WTRU may detect the amount of time that the WTRU is expected to be available.

As shown in FIG. 2, at 230, the WTRU may send a registration request to the network. The registration request may include a WTRU unavailability duration. The WTRU's unavailability duration may be set to a value that is greater than or equal to the back-off duration (e.g., timer value), for example, based on the back-off duration (e.g., timer) running and/or based on the back-off duration (e.g., timer) value being greater than the amount of time that the WTRU is expected to be available.

As shown in FIG. 2, at 240, the WTRU may receive a registration accept message from the network. The registration accept message may include an indication that the previously provided back-off duration (e.g., timer, e.g., T3346) may continue to run and not be reset, which may cause or trigger the WTRU to continue to apply NAS level congestion control. The registration accept message may include a different (e.g., new) back-off duration (e.g., timer) value (e.g., T3346) to indicate to the WTRU that the WTRU may still consider NAS level congestion control to be active, which may cause or trigger the WTRU to continue to apply NAS level congestion control and/or to assign a different (e.g., new) value to the back-off duration (e.g., timer). The registration accept message may include an indication that the WTRU may inform the AMF when the WTRU becomes available again, for example, even if the back-off duration (e.g., timer) is running (e.g., T3346), which may trigger the WTRU to send a registration update request to the network when the unavailability event is over. The registration update request may refrain from including (e.g., not include) an unavailability period duration. The registration accept message may include an indication that the WTRU may refrain from informing (e.g., not inform) the AMF when the WTRU becomes available again if the back-off duration (e.g., timer) is running (e.g., T3346), which may cause or trigger the WTRU to not send a registration update request to the network when the unavailability event is over while the back-off duration (e.g., timer) is still running. The WTRU may (e.g., determine to) send a registration update request to the network when the back-off duration (e.g., timer) expires. The registration update request may refrain from including (e.g., not include) an unavailability period duration.

Unavailability period support may be provided while the WTRU is registered (e.g., only) on non-3GPP access. A network (e.g., a 5G system) may allow (e.g., indicate to) a WTRU to send a Registration Request to the AMF over non-3GPP access. The Registration Request may include unavailability information (e.g., an Unavailability period duration information element (IE).

An AMF may (e.g., be triggered to) perform one or more actions based on (e.g., upon) reception of unavailability information (e.g., an Unavailability period duration information element) from a WTRU that is registered over non-3GPP access. For example, the AMF may be triggered to perform one or more of the following actions.

The AMF may send a Registration Response to the WTRU, for example, to indicate that the Unavailability period duration request was accepted and that the network now considers the WTRU to be in an idle state (e.g., 5GMM-IDLE state). The AMF may indicate acceptance of the Unavailability period duration, for example, by sending an Accepted Unavailability period duration to the WTRU. The AMF may assign an Accepted Unavailability period duration that is equal to or greater than the requested Unavailability period duration.

The AMF may consider the WTRU to be in an idle state (e.g., 5GMM-IDLE state).

The AMF may start tracking a duration (e.g., a wait-timer). The AMF may assign the duration (e.g., wait-timer) an initial value, which may be equal to the Unavailability period duration that was provided in the Registration Request.

The AMF may consider the WTRU as unreachable until the WTRU sends an initial NAS message. Examples of initial NAS messages include, for example, a registration request, a service request, and/or a control plane service request.

The AMF may consider the WTRU to be de-registered (e.g., in the 5GMM-DEREGISTERED state), for example, if the duration (e.g., wait-timer) expires before the AMF receives an initial NAS message from the WTRU.

Figure 3:
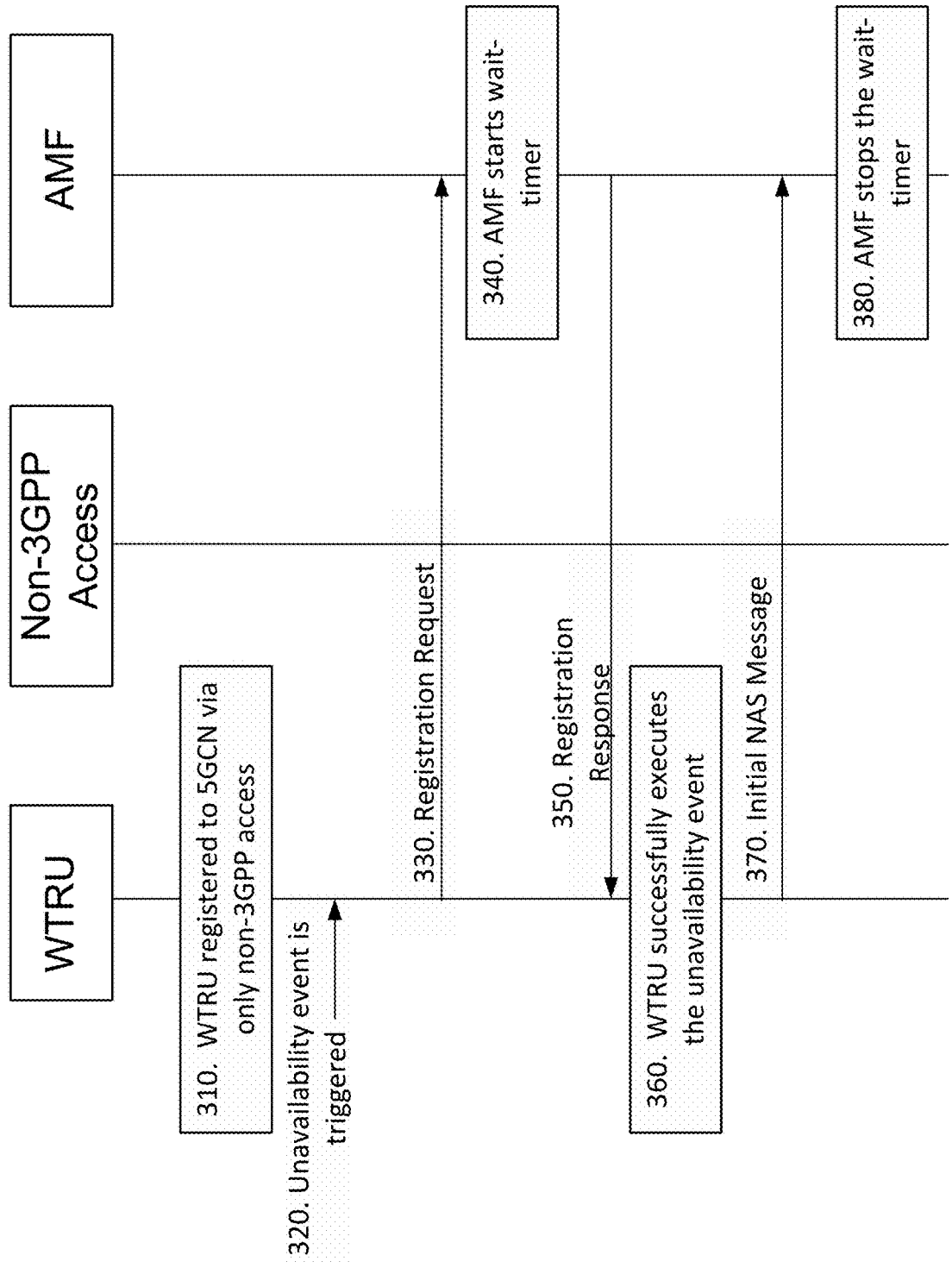
FIG. 3 illustrates an example when the unavailability period feature is used by a WTRU that is registered via non-3GPP access.

FIG. 3 illustrates an example of when the unavailability period feature is used by a WTRU that is registered via non-3GPP access. For example, FIG. 3 shows support for an unavailability period feature when a WTRU may be registered to a network (e.g., 5GCN) via (e.g., only) non-3GPP access.

As shown in FIG. 3, at 310, the WTRU may be registered to the 5GCN via a (e.g., only) non-3GPP access. The non-3GPP access may be trusted or untrusted.

At 320, an event may occur in the WTRU that may make the WTRU unavailable for a (e.g., certain) period of time.

At 330, the WTRU may send a Registration Request to the AMF, e.g., via the non-3GPP access network. The Registration Request may include the unavailability information (e.g., Unavailability period duration information element).

At 340, the AMF may start tracking a duration (e.g., a wait-timer). The AMF may initially set the duration (e.g., wait-timer) value to be equal to or greater than the Unavailability period duration.

At 350, the AMF may send a Registration Accept Message to the WTRU. The Registration Accept Message may indicate acceptance of the requested unavailability period duration and/or may provide the WTRU with an unavailability period duration value that the WTRU may use. The AMF may (e.g., now) consider the WTRU to be in an idle state (e.g., 5GMM-IDLE state) and unreachable. The AMF may indicate to the SMF that the WTRU is unreachable, for example, if a downlink data notification may be received from an SMF. The AMF may trigger a Loss of Connectivity event report towards the NEF, for example, if there is a Loss of Connectivity event subscription for the WTRU by the AF. The Loss of Connectivity event report may include an unavailability period. The unavailability period may (e.g., also) be reported to the respectively subscribed AF.

At 360, the WTRU may (e.g., successfully) execute the event that made the WTRU unavailable, e.g., Silent reset at Modem, Security patch updates, OS upgrade, Modem SW updates, and/or Device reboot upon Modem setting changes via OMA-DM.

At 370, the WTRU may send an initial NAS message to the network, for example, to indicate to the AMF that the WTRU is now reachable.

At 380, the AMF may stop tracking the duration (e.g., stop the wait-timer), for example, based on (e.g., upon) receipt of the initial NAS message. The AMF may consider the WTRU to be in a connected state (e.g., 5GMM-CONNECTED state) and/or consider the WTRU to be reachable. The AMF may (e.g., implicitly) de-register the WTRU, for example, if the message provided at 370 is not received or is not received before the wait-time expires.

Unavailability period support may be provided for MUSIM devices. Unavailability coordination may be provided across networks.

A WTRU may be registered to multiple (e.g., two (2) networks. The WTRU may send a registration request to the first network (e.g., among the multiple networks). The registration request may include an unavailability period duration. The first network may respond with a registration accept message and/or a periodic registration duration (e.g., timer), which may be larger than or equal to the requested unavailability period duration. The WTRU may (e.g., then) send a registration request to a second network. The WTRU may include a second unavailability period duration in the request to the second network. The WTRU may (e.g., choose to) set the second unavailability period duration to a value that is equal to or greater than the periodic registration timer that was received from the first network. This approach may help ensure that the second network refrains from indicating (e.g., does not indicate) to the WTRU that the WTRU may re-register before (e.g., long before) the time that is associated with (e.g., requested by) the first network.

Figure 4:
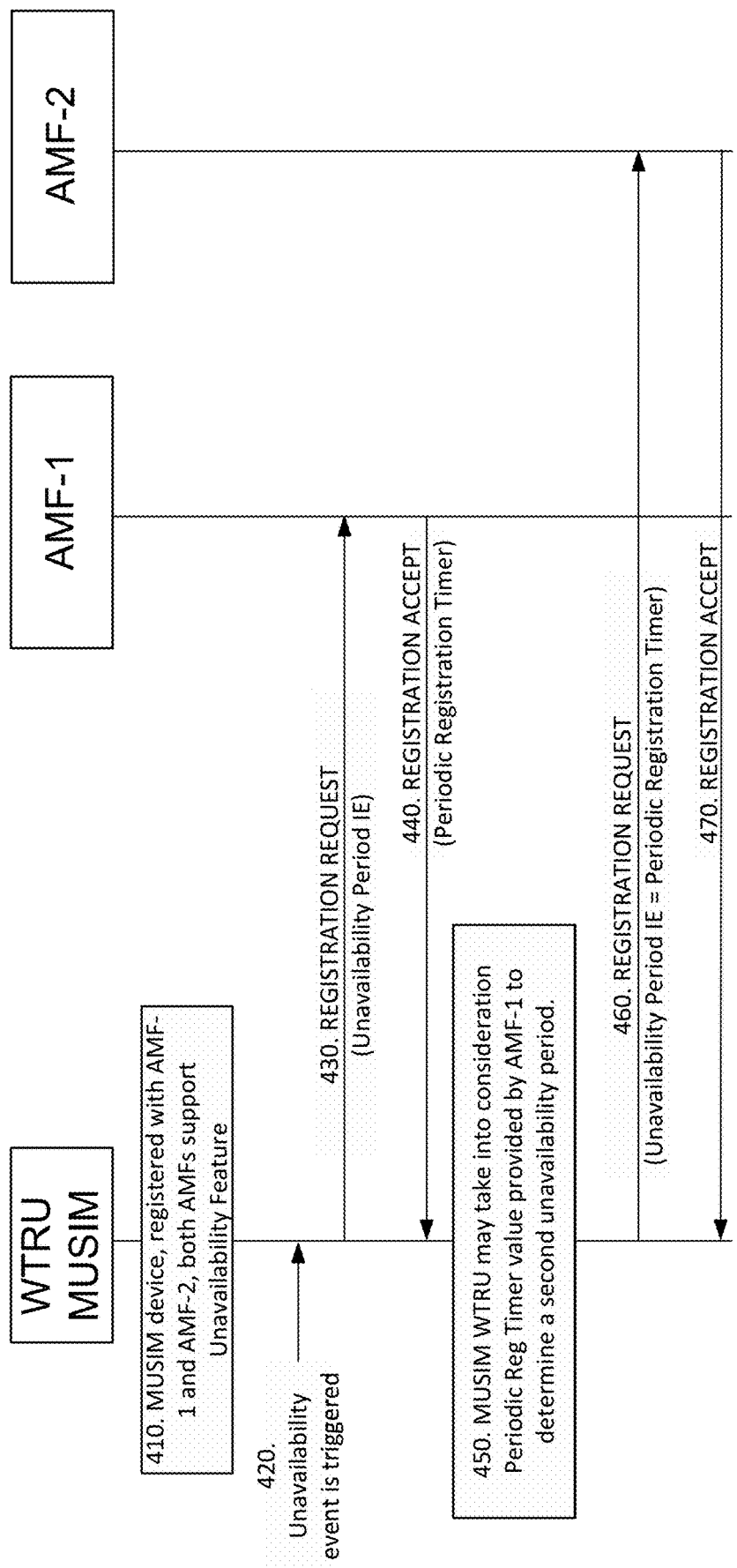
FIG. 4 illustrates an example of unavailability coordination across networks.

FIG. 4 shows an example of how a WTRU may use the unavailability period feature in a scenario where the MUSIM feature is also used.

FIG. 4 illustrates an example procedure for unavailability coordination across networks.

As shown in FIG. 4, at 410, the MUSIM WTRU may be registered to multiple (e.g., two (2) networks.

At 420, the WTRU may detect that the WTRU needs to execute an event that may be associated with the WTRU being unavailable (e.g., require the WTRU to be unavailable) for a period of time. The WTRU may determine a first unavailability period duration.

At 430, the WTRU may send a registration request to the first network. The registration request may include the first unavailability period duration.

At 440, the AMF of the first network may send a Registration Response to the WTRU. The Registration Response may include a periodic registration duration (e.g., timer), which may be greater than or equal to the first unavailability period duration.

At 450, the WTRU may determine a second unavailability period duration. The WTRU may set the second unavailability period duration to a value that is equal to or greater than the periodic registration timer that was received from the first network. Setting the second unavailability period duration in this manner may ensure that the WTRU may have enough time to contact the multiple (e.g., both) networks at the completion of the unavailability period.

At 460, the WTRU may send a registration request to the second network. The registration request may include the second unavailability period duration.

At 470, the AMF of the second network may send a Registration Response to the WTRU. The Registration Response may include a second periodic registration duration (e.g., timer), which may be greater than or equal to the second unavailability period duration.

In some examples, multiple (e.g., both or all) networks may support an unavailability period feature. For example, a MUSIM WTRU may have multiple SIM Cards, e.g., more than two (2) USIM's. The MUSIM WTRU may be registered to different networks. In some examples (e.g., the following example shown in FIG. 5), a MUSIM WTRU may be equipped with multiple (e.g., two) USIM cards and/or may be registered with multiple (e.g., two) different (e.g., 5G) networks. Other configurations may be implemented.

Figure 5:
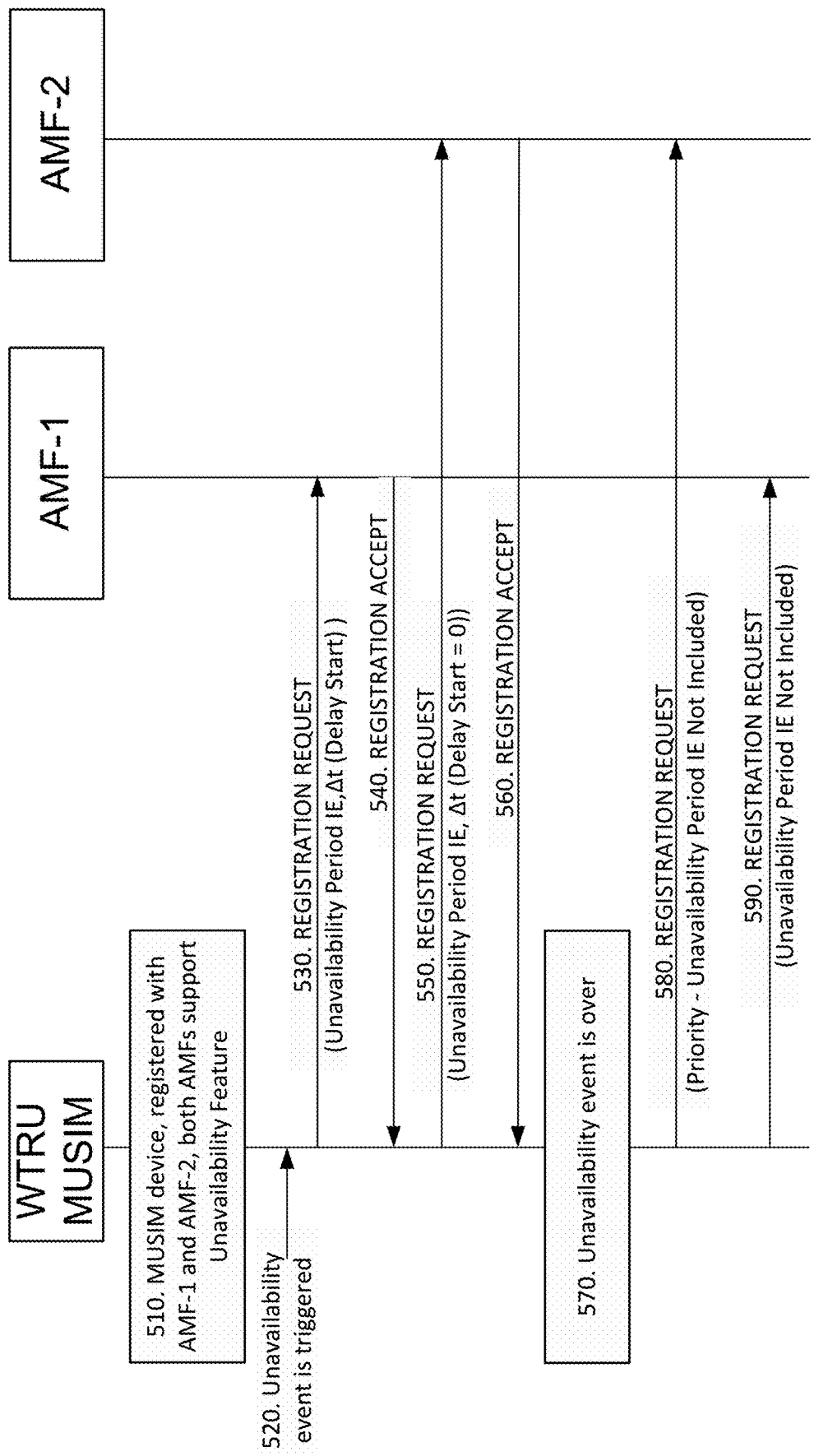
FIG. 5 illustrates an example of unavailability coordination across multiple networks when the multiple networks (e.g., both 5G networks) support an unavailability feature.

FIG. 5 illustrates an example of unavailability coordination across multiple networks when the multiple networks (e.g., both 5G networks) support an unavailability feature.

As shown in FIG. 5, at 510, a MUSIM device with two (2) active USIM cards may be successfully registered with two (2) different (e.g., 5G) networks (e.g., AMF-1 and AMF-2) that support the unavailability feature.

At 520, an event may occur in the WTRU that may make the WTRU unavailable for a (e.g., certain) period of time. The WTRU (e.g., as a MUSIM device) may communicate with the network (e.g., 5GS) sequentially. The MUSIM WTRU may take into consideration delay with respect to the (de) registration procedure.

At 530, the MUSIM WTRU may select/pick the first network, e.g., AMF-1. The WTRU may send a REGISTRATION REQUEST message to AMF-1. The message may include the unavailability period duration IE, e.g., along with a start delay (e.g., Δt). Delay Start (Δt) may inform the network AMF-1 that the unavailability period may account for the delay with the provided delay start duration value and/or the actual duration for which the WTRU would be unavailable, e.g., unavailability period duration+Δt. Delay Start may be calculated taking into account the number of pending (de-) registration procedures that a MUSIM WTRU may (e.g., need to) perform to inform other networks about the unavailability. For example, Δt may be calculated as Δt=(N=1)×(Time requested (e.g., required) for (de) registration informing about unavailability to AMF-2+registration to inform the network (AMF-2) about end of unavailability period), where N may be the number of (de) registrations the MUSIM may (e.g., need to) carry out. In the example scenario shown in FIG. 5, there may be one (1) more registration event to inform AMF-2 about the unavailability period. The time associated with (e.g., required (e.g., requested) for) (de) registration may take into account the best and/or worst possible case, e.g., retransmission timers/counters, re-attempt timers/counters, etc. A deregistration as power down may take into account the duration (e.g., timer) for which the WTRU may wait for the response from the network. The MUSIM WTRU may consider a (e.g., an implicit) deregistration, for example, if there is no response from the network.

At 440, AMF-1 may respond with the REGISTRATION ACCEPT message. The AMF-1 may (e.g., subsequently to) release the RRC signaling connection.

At 550, the MUSIM WTRU may send a REGISTRATION REQUEST to the second AMF, e.g., AMF-2, as the last instance that needs to be informed about the unavailability. Delay start may be set to zero (0), e.g., Δt=0.

At 560, AMF-2 may respond with the REGISTRATION ACCEPT message. The AMF-2 may (e.g., subsequently to) release the connection (e.g., RRC signaling connection).

At 570, the MUSIM WTRU may (e.g., successfully) execute the event that made the MUSIM WTRU unavailable, e.g., Silent reset at Modem, Security patch updates, OS upgrade, Modem SW updates, and/or Device reboot upon Modem setting changes via OMA-DM.

At 580, the MUSIM WTRU may send a REGISTRATION REQUEST message to the AMF-2 (e.g., refraining from including (e.g., not including) the unavailability period duration IE), informing the network that the MUSIM WTRU is (e.g., now) available. There may be a sequence for coming out of unavailability. For example, the network informed last about the unavailability period may be the first network to be informed about availability. In the example scenario, AMF-2 may be given priority over AMF-1 to inform about the availability of the WTRU. The delay start provided to the AMF-1 may take into consideration the delay with respect to informing the other network about unavailability, which may be followed by availability and/or corresponding procedure timings.

At 590, the MUSIM WTRU may send a REGISTRATION REQUEST message to AMF-1 (e.g., not including the unavailability period duration IE), informing the network that the MUSIM WTRU is (e.g., now) available.

With reference to FIG. 5, an example is provided where multiple (e.g., both or all) networks may support an unavailability period feature. A MUSIM WTRU may perform one or more of the following.

As shown in FIG. 5, at 510-520, a MUSIM device (e.g., WTRU) with two (2) active USIM cards may be (e.g., successfully) registered with two (2) different (e.g., 5G) networks, e.g., AMF-1 and AMF-2, that support the unavailability feature. An event may occur in the WTRU that may make the WTRU unavailable for a (e.g., certain) period of time. The WTRU (e.g., as a MUSIM device) may communicate with the network (e.g., 5GS) sequentially. The MUSIM WTRU may take into consideration a delay with respect to the (de) registration procedure.

As shown in FIG. 5, at 530/540, the MUSIM WTRU may select/pick the first network (e.g., AMF-1), and send a REGISTRATION REQUEST message, which may include the unavailability period duration IE) and/or a start delay Δt. Delay Start (Δt) may inform the network AMF-1 that the unavailability period may account for the delay with the provided delay start duration value. The actual duration for which the WTRU may be unavailable may be the unavailability period duration+Δt. Delay Start may be calculated, for example, by taking into account the number of pending (de)-registration procedures the MUSIM WTRU may (e.g., need to) perform to inform other networks about the unavailability.

In the example shown in FIG. 5, for example, Δt may be determined as Δt=(N=1)×(Time requested (e.g., required) for (de) registration informing about unavailability to AMF-2+registration to inform the network (AMF-2) about the end of the unavailability period), where N may be the number of (de) registrations the MUSIM may (e.g., need to) perform. In the example scenario shown in FIG. 5, there may be one (1) more registration event to inform AMF-2 about the unavailability period.

The time associated with (e.g., required for) (de) registration may take into account the best and/or worst possible case, e.g., retransmission timers/counters, re-attempt timers/counters, etc. A deregistration as power down may take into account the duration (e.g., timer duration) for which the WTRU may wait for the response from the network. The MUSIM WTRU may consider a deregistration (e.g., an implicit deregistration), for example, if there is no response from the network. The AMF-1 may (e.g., subsequently) release the RRC signaling connection, for example, if the AMF-1 responds with the REGISTRATION ACCEPT message.

As shown in FIG. 5, at 550/560, the MUSIM WTRU may send a REGISTRATION REQUEST to the second AMF (e.g., AMF-2), as the last instance that needs to be informed about the unavailability. The delay start may be set to zero (0), e.g., Δt=0. AMF-2 may respond with the REGISTRATION ACCEPT message. The AMF-2 may (e.g., subsequently) release the connection (e.g., RRC signaling connection).

As shown in FIG. 5, at 570/580/590, the WTRU may (e.g., successfully) execute the event that made the WTRU unavailable, e.g., Silent reset at Modem, Security patch updates, OS upgrade, Modem SW updates, and/or Device reboot upon Modem setting changes via OMA-DM. The MUSIM WTRU may send a REGISTRATION REQUEST message to AMF-2 (e.g., not including the unavailability period duration IE), informing the network that the MUSIM WTRU is (e.g., now) available. There may be a sequence for coming out of unavailability. For example, the network informed last about the unavailability period may be the first network to be informed about availability. For example, as shown in FIG. 5, AMF-2 may be given priority over AMF-1 to inform about the availability of the WTRU. The delay start provided to AMF-1 may take into consideration the delay with respect to informing the other network about unavailability, e.g., followed by availability and corresponding procedure timings. The MUSIM WTRU may send a REGISTRATION REQUEST message to AMF-1 (e.g., not including the unavailability period duration IE), informing the network that the MUSIM WTRU is (e.g., now) available.

In some examples, one of the networks may not support an unavailability period feature.

Figure 6:
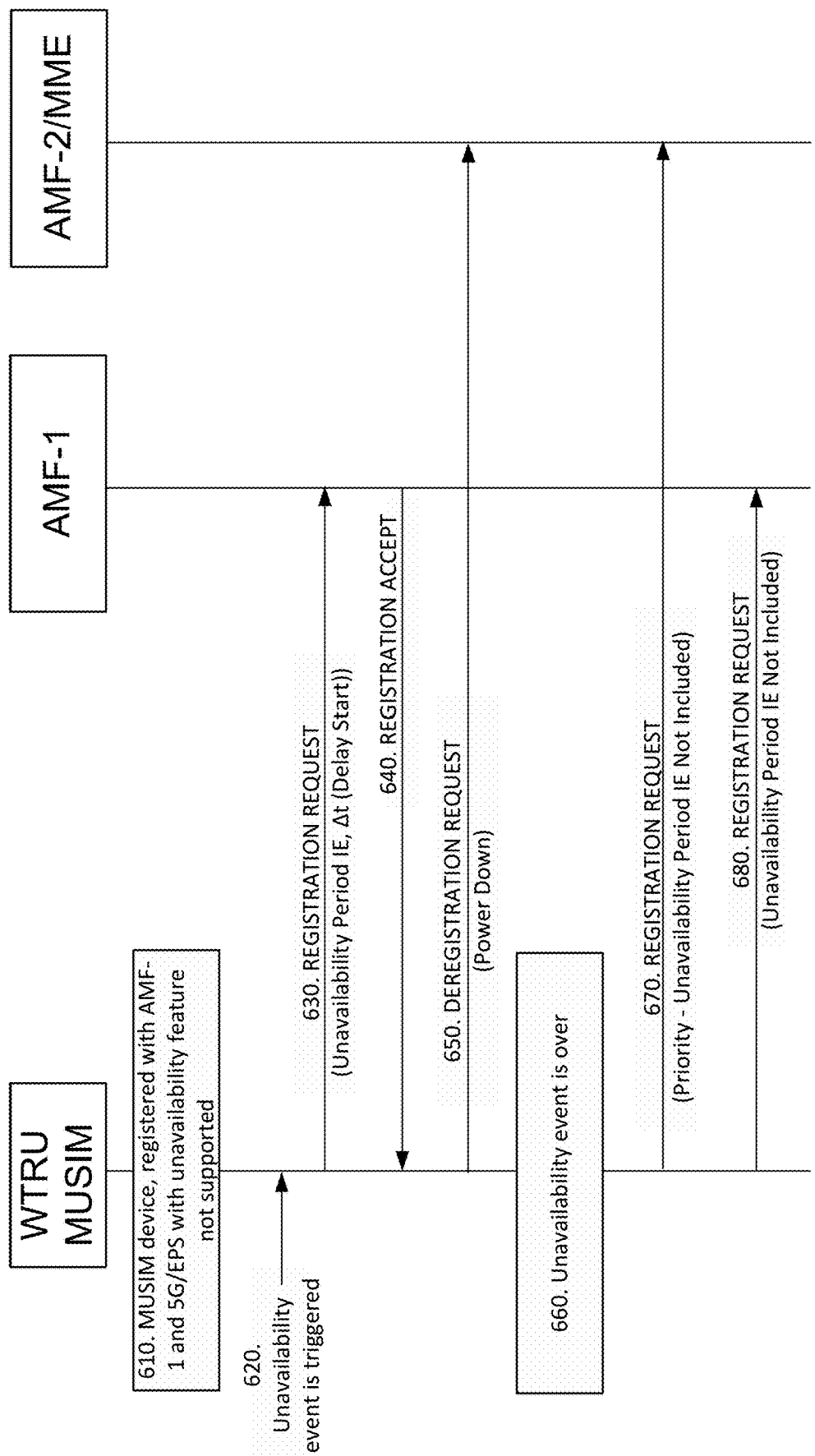
FIG. 6 illustrates an example of unavailability coordination across multiple networks when one of the networks does not support an unavailability feature of a MUSIM WTRU.

FIG. 6 illustrates an example of unavailability coordination across multiple networks when one of the networks does not support an unavailability feature of a MUSIM WTRU.

As shown in FIG. 6, at 610, a MUSIM device (e.g., WTRU) may have multiple (e.g., two (2) active USIM cards. The MUSIM WTRU may be registered (e.g., successfully registered) with two (2) different networks, e.g., AMF-1 and AMF-2/MME. In the example scenario shown in FIG. 6, the second network may be an EPS that does not support an unavailability feature or a 5G network (e.g., AMF) that does not support the unavailability feature.

At 620, an event may occur in the WTRU that may make the WTRU unavailable for a (e.g., certain) period of time. The WTRU (e.g., as a MUSIM device) may communicate sequentially with the network (e.g., 5GS). The MUSIM WTRU may take into consideration delay with respect to the (de) registration procedure.

At 630, the MUSIM WTRU may select/pick the first network (e.g., AMF-1) to which to send a REGISTRATION REQUEST message, e.g., including the unavailability period duration IE and/or a start delay Δt. Delay Start (Δt) may inform the network AMF-1 that the unavailability period may account for the delay with the provided delay start duration value. The actual duration for which the WTRU may be unavailable may be the unavailability period duration+Δt. Delay Start Δt may be calculated, for example, by taking into account the number of pending (de)-registration procedures the MUSIM WTRU may (e.g., need to) perform to inform other networks about the unavailability. For example, as shown in FIG. 6, the other network may not support the unavailability feature (e.g., EPS or 5GS with feature not supported). The delay start may take into account the duration associated with (e.g., it may take for) deregistering the WTRU from the other network.

At 640, AMF-1 may respond with a REGISTRATION ACCEPT message. AMF-1 may (e.g., subsequently) release the RRC signaling connection.

At 650, the second network (AMF-2/MME) may not support the feature. The WTRU may trigger deregistration toward the network, for example, by sending a DEREGISTRATION REQUEST message (e.g., with a cause code as power down).

In some examples, the MUSIM WTRU and AMF-2/MME may support MICO mode, the MUSIM WTRU may initiate MICO mode, e.g., instead of the deregistration procedure. The network may take into consideration the provided unavailability period duration while setting up the active time for the MICO mode. The active time may not coincide with the unavailability period. The active time may start after the unavailability period duration. The network may (e.g., alternatively) set the periodic registration duration (e.g., timer duration) equal to or greater than the unavailability period duration, which may ensure that the WTRU may perform the periodic registration when it becomes reachable again. The network may re-configure the WTRU with desired parameters (e.g., new periodic registration duration/timer value) during the periodic registration.

In some examples, a deregistration may be performed first. The MUSIM WTRU may deregister itself from the network that does not support the unavailability feature. The MUSIM WTRU may (e.g., subsequently) perform the unavailability procedure with the supporting second network.

At 660, the WTRU may (e.g., successfully) execute the event that made the WTRU unavailable, e.g., Silent reset at Modem, Security patch updates, OS upgrade, Modem SW updates, and/or Device reboot upon Modem setting changes via OMA-DM.

At 670, the MUSIM WTRU may send a REGISTRATION REQUEST message to the AMF-2 (e.g., refraining from including (e.g., not including) the unavailability period duration IE), informing the network that the MUSIM WTRU is (e.g., now) available. There may be a sequence for coming out of unavailability. For example, the network informed last about the unavailability period may be the first network to be informed about availability. For example, as shown in FIG. 5, AMF-2/MME may be given priority over AMF-1 to inform about the availability of the WTRU. The delay start provided to AMF-1 may take into consideration the delay with respect to informing the other network about unavailability, e.g., followed by availability and corresponding procedure timings.

At 680, the MUSIM WTRU may send a REGISTRATION REQUEST message to the AMF-1 (e.g., not including the unavailability period duration IE), which may inform the network that the MUSIM WTRU is (e.g., now) available.

With reference to FIG. 6, a further example procedure is provided where one of the networks may not support an unavailability period feature. A MUSIM WTRU may implement one or more of the following.

As shown in FIG. 6, at 610-620, the MUSIM device (e.g., WTRU) may have two (2) active USIM cards. The MUSIM WTRU may be successfully registered with two (2) different networks, e.g., AMF-1 and AMF-2/MME. In an example scenario, the second network may be an EPS that does not support an unavailability feature or a 5G network (e.g., AMF) that does not support the unavailability feature. An event may occur in the WTRU that may make the WTRU unavailable for a certain period of time. The WTRU (e.g., as a MUSIM device) may communicate (e.g., sequentially) with the 5GS. The MUSIM WTRU may take into consideration delay with respect to the (de) registration procedure.

As shown in FIG. 6, at 630/640, the MUSIM WTRU may pick the first network, e.g., AMF-1, and send a REGISTRATION REQUEST message, e.g., including the unavailability period duration IE and/or a start delay Δt. Delay Start (Δt) may inform the network AMF-1 that the unavailability period may account for the delay with the provided delay start duration value. The actual duration for which the WTRU may be unavailable may be calculated as the unavailability period duration+Δt. Delay Start Δt may be calculated, for example, by taking into account the number of pending (de)-registration procedures that the MUSIM WTRU may (e.g., need to) perform to inform other networks about the unavailability. For example, as shown in FIG. 6, the other network does not support the unavailability feature (e.g., EPS or 5GS with feature not supported). The delay start may take into account the duration it may take for deregistering the MUSIM WTRU from the other network. AMF-1 may respond with the REGISTRATION ACCEPT message. AMF-1 may (e.g., subsequently) release the connection (e.g., RRC signaling connection).

As shown in FIG. 6, at 650, the second network (e.g., AMF-2/MME) may not support the feature. The WTRU may trigger deregistration toward the network, for example, by sending a DEREGISTRATION REQUEST message, e.g., with cause code as power down.

In some examples, the MUSIM WTRU and AMF-2/MME may support MICO mode. The MUSIM WTRU may initiate MICO mode, for example, instead of the deregistration procedure. The network may take into consideration the provided unavailability period duration while setting up the active time for the MICO mode. The active time may not coincide with the unavailability period. The active time may start after the unavailability period duration. The network may (e.g., alternatively) set the periodic registration duration (e.g., timer duration) equal to or greater than the unavailability period duration, which may ensure that the WTRU may perform the periodic registration when the WTRU becomes reachable again. The network may re-configure the WTRU with desired parameters (e.g., new periodic registration duration/timer value) during the periodic registration.

In some examples, a deregistration step may be the first step. For example, the MUSIM WTRU may deregister itself from the network that does not support the unavailability feature. The WTRU may (e.g., subsequently) perform the unavailability procedure with the supporting second network.

As shown in FIG. 6, at 660/670/680, the WTRU may (e.g., successfully) execute the event that made the WTRU unavailable, e.g., Silent reset at Modem, Security patch updates, OS upgrade, Modem SW updates, and/or Device reboot upon Modem setting changes via OMA-DM. The MUSIM WTRU may send a REGISTRATION REQUEST message to the AMF-2 (e.g., not including the unavailability period duration IE), informing the network that the MUSIM WTRU is (e.g., now) available. There may be a sequence for coming out of unavailability. For example, the network informed last about the unavailability period may be the first network to be informed about availability. For example, as shown in FIG. 6, AMF-2/MME may be given priority over AMF-1 to inform about the availability of the WTRU. The delay start provided to AMF-1 may take into consideration the delay with respect to informing the other network about unavailability, e.g., followed by availability and corresponding procedure timings. The MUSIM WTRU may send a REGISTRATION REQUEST message to the AMF-1 (e.g., not including the unavailability period duration IE), informing the network that the MUSIM WTRU is (e.g., now) available.

Unavailability period support may be provided for devices registered to multiple networks (e.g., both EPC and 5GC). The AMF may detect that the WTRU is capable of operating in S1 and N1 modes. For example, the AMF may receive an initial registration request from a WTRU that is already registered to EPC, e.g., the AMF may receive an initial registration request from a WTRU whose EMM state is EMM-REGISTERED. The AMF may detect that the WTRU is registered to EPS, for example, if the Initial Registration Request includes the WTRU State information element with the N1 mode reg bit of the WTRU State information element set to a value of 1, which may indicate that the WTRU is in EMM-REGISTERED state.

A WTRU that is capable of operating in S1 and N1 modes may detect that an event needs to be executed that may make the WTRU unavailable for a period. The WTRU may (e.g., determine to) send an unavailability period duration to the AMF, e.g., so that the AMF may know that the WTRU may be unreachable and/or that the WTRU's context should be maintained by the network (e.g., 5GS) while the WTRU is executing the event and unavailable.

The AMF may (e.g., based on the registration request) send a notification to the MME (e.g., via the N26 interface), for example, if the AMF detects that the WTRU is capable of operating in S1 and N1 Modes, has a common registration for 5G and EPS access, or is dual-registered and in examples the AMF receives a registration request from the WTRU that includes the unavailability period duration. The notification may indicate to the MME that the WTRU is about to be unavailable for a period of time. The notification may include the unavailability period duration or the Periodic Registration Time that the AMF may send to the WTRU in the Registration Response. The MME may determine (e.g., be made aware of) how long to expect the WTRU to be unavailable, for example, based on the unavailability period duration or the Periodic Registration Time in the notification. The MME may perform one or more (e.g., any combination) of the following actions based on receiving the notification.

For example, the MME may (e.g., begin to) consider the WTRU unreachable and/or may reject a (e.g., any) downlink data notification that is associated with the WTRU, e.g., until at least the time period that was indicated in the notification has elapsed. The MME may (e.g., also) adjust a duration (timer, e.g., the implicit detach timer) that may be associated with the WTRU, for example, by assigning the duration (e.g., timer) a value that is at least the time period that was indicated in the notification.

For example, the MME may respond to the AMF with an indication that the MME does not agree to maintain the WTRU's context while the WTRU is unavailable and/or that the AMF may indicate to the WTRU that the WTRU may consider the WTRU to be de-registered from the EPS, e.g., and that the WTRU may transition from the EMM-REGISTERED to the EMM-DEREGISTERED state. The response from the MME may (e.g., also) include a different (e.g., new) periodic tracking area update duration (e.g., timer) value for the AMF to send to the WTRU.

The AMF may send a registration response to the WTRU, for example, based on (e.g., upon) sending the notification to the MME and receiving a response from the MME. The Registration Response may include, for example, one or more of the following indications: an indication that the unavailability period was shared with the MME and/or that the WTRU may perform a Tracking Area Update with the MME when the unavailability event may be complete; an indication that the unavailability period was rejected by the MME and/or that WTRU consider the WTRU to be deregistered from the EPS, e.g., and transition from the EMM-REGISTERED to the EMM-DEREGISTERED state; and/or a value (e.g., new value) that the WTRU may assign to its EPS periodic tracking area update duration (e.g., timer) value.

The WTRU may complete the unavailability period. The WTRU may (e.g., upon completion of the unavailability period) perform a registration area update procedure with the 5GS and a tracking area update procedure with the EPS. The tracking area update procedure may be performed, for example, (e.g., only) if the WTRU has not transitioned to the EMM-DEREGISTERED state. The WTRU may perform an attach procedure with the EPS, for example, if the WTRU has transitioned to the EMM-DEREGISTERED state.

Advantages provided by unavailability support for devices registered to multiple networks (e.g., EPC and 5GC) may include, for example, one or more of the following: EPS NAS signaling may refrain from changing (e.g., not need to change); EPS Context may be maintained while the WTRU is in the unavailability period; and/or the WTRU may determine (e.g., be made aware) if the MME is unable or unwilling to maintain the EPS context while the WTRU is in the unavailability period.

Figure 7:
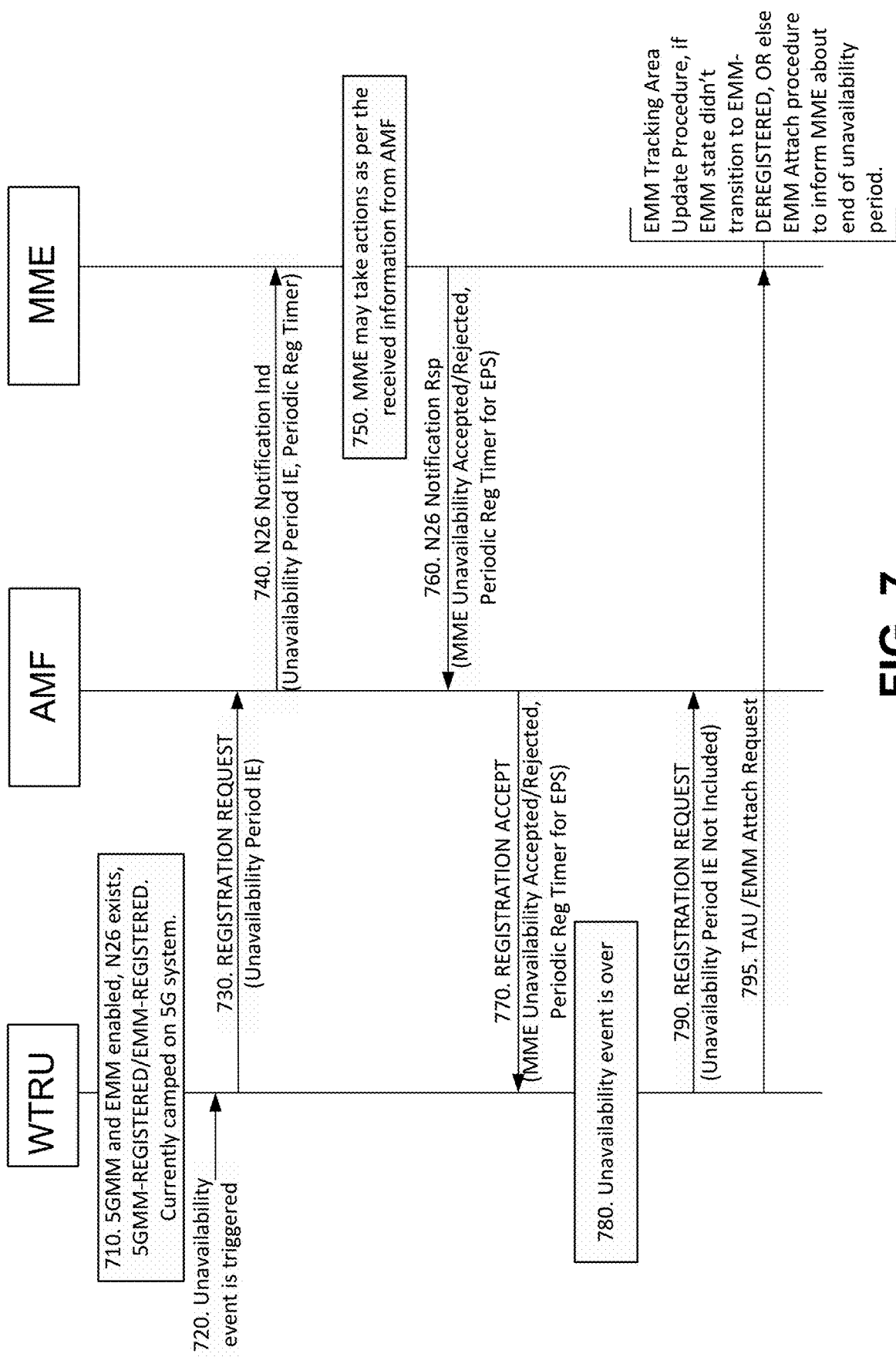
FIG. 7 illustrates an example of a dual registration scenario where a WTRU has a 5GMM and EMM context.

FIG. 7 illustrates an example of a dual registration scenario where a WTRU has a 5GMM and EMM context.

As shown in FIG. 7, at 710, the WTRU may be 5GMM and EMM enabled. The WTRU may operate in a single registration mode. The WTRU may maintain a (e.g., one) common registration for 5GMM for 3GPP access and EMM. The WTRU may be successfully updated on both 5GMM and EMM (e.g., the S1 mode registration status is EMM-REGISTERED, and N1 mode registration status is 5GMM-REGISTERED). The WTRU may be currently camped on a 5G cell in idle mode. 5GS or EPS may indicate (e.g., in the last registration procedure) support for the interworking with the N26 as part of the 5GS network feature support IE or EPS network feature support IE with the WK N26 bit set to "interworking without N26 interface not supported."

At 720, an event may occur in the WTRU that may make the WTRU unavailable for a (e.g., certain) period of time.

At 730, the WTRU may trigger the REGISTRATION REQUEST procedure toward the AMF. The WTRU may provide the unavailability period IE to inform the network about the WTRU's unavailability duration.

At 740, the AMF may send a notification to the MME, e.g., via the N26 interface. The notification may indicate to the MME that the WTRU is (e.g., about to be) unavailable for a period of time. The notification may include the unavailability period duration or the Periodic Registration Time that the AMF may send to the WTRU in the Registration Response. The MME may be made aware of how long to expect the WTRU to be unavailable, for example, based on the unavailability period duration or the Periodic Registration Time in the notification.

At 750, the MME may perform one or more (e.g., any combination) of the following actions based on receiving the notification from the AMF, e.g., over the N26 interface.

For example, the MME may (e.g., begin to) consider the WTRU unreachable. The MME may reject a (e.g., any) downlink data notification that may be associated with the WTRU, e.g., until at least the time period indicated in the notification has elapsed. The MME may (e.g., also) adjust a duration (e.g., timer, e.g., the implicit detach timer) that is associated with the WTRU, e.g., by assigning a duration (e.g., assigning the timer) a value that is at least the time period that was indicated in the notification.

For example, the MME may respond to the AMF with an indication that the MME does not agree to maintain the WTRU's context while the WTRU is unavailable, that the AMF (e.g., may) indicate to the WTRU that the WTRU may consider the WTRU to be de-registered from the EPS, and/or that the WTRU (e.g., may) transition from the EMM- REGISTERED to the EMM-DEREGISETERD state. The response from the MME may (e.g., also) include a (e.g., new) periodic tracking area update duration (e.g., timer) value for the AMF to send to the WTRU.

At 760, the MME may respond to the notification from the AMF (e.g., via the N26 interface). The MME response may include information indicating, for example, if the unavailability request from the WTRU has been accepted/rejected by the MME and/or the periodic registration timer duration that may be relayed back to the WTRU, e.g., via the AMF.

At 770, the AMF may provide the REGISTRATION ACCEPT to the WTRU. The Registration Response may include one or more of the following indications: an indication that the unavailability period was shared with the MME, that the WTRU may perform a Tracking Area Update with the MME when the unavailability event is complete, and/or that the EMM state may be EMM-REGISTERED; an indication that the unavailability period was rejected by the MME, that the WTRU may consider itself to be deregistered from the EPS, and/or that the WTRU may transition from the EMM-REGISTERED to the EMM-DEREGISTERED state; and/or a new value that the WTRU may assign to the WTRU's EPS periodic tracking area update timer value.

At 780, the WTRU may (e.g., successfully) execute the event that made the WTRU unavailable, e.g., Silent reset at Modem, Security patch updates, OS upgrade, Modem SW updates, and/or Device reboot upon Modem setting changes via OMA-DM.

At 790, the WTRU coming out of the unavailability period may perform the registration procedure with the AMF, e.g., without including the unavailability period IE.

At 795, the WTRU may (e.g., depending upon the outcome and response the WTRU received from the MME via AMF) trigger an EMM Tracking Area Update Procedure (e.g., in case EMM state is EMM-REGISTERED) or an EMM ATTACH procedure (e.g., in case EMM state is EMM-DEREGISTERED) to indicate to the MME that the unavailability period has ended and that the WTRU is reachable again.

Analytics (e.g., NWDAF) may be supported for the unavailability period feature. The Namf_EventExposure service of the AMF may support an NF invoker (e.g., the NWDAF) subscribing to an event (e.g., a WTRU unavailability event). The AMF may report WTRU unavailability information to the NF invoker when the event occurs. The WTRU unavailability information may include one or more of the following: WTRU identifier(s); unavailability time information for a (e.g., each) WTRU Identifier; and/or an indication of an expected action, e.g., when each WTRU becomes available.

The AMF may provide WTRU unavailability information if (e.g., when) the invoker NF subscribes to or invokes the Namf_EventExposure Subscribe service operation and provides an Event ID, such as (e.g., equal to), for example, one or more of the following: Registration-State-Report, a Connectivity-State-Report, a Reachability-Report, UEs-In-Area-Report, 5GS-User-State-Report, Frequent-Mobility-Registration-Report, UE-Access-Behavior-Trends, and/or UE-MM-Transaction-Report. Additionally and/or alternatively, an Event ID (e.g., new Event ID) may be defined (e.g., WTRU unavailability information). The AMF may provide WTRU unavailability information if (e.g., when) the invoker NF subscribes to or invokes the Namf_EventExposure Subscribe service operation and provides an Event ID (e.g., that is equal to "WTRU unavailability information").

The unavailability time information that is provided by the AMF to the invoker NF for a WTRU, may be, for example, one or more of the following: equal to the unavailability period duration that was requested by the WTRU; set to an absolute time value that is based on the unavailability period duration that was requested by the WTRU; set to a value that indicates how much time the AMF expects or needs to pass until the unavailability time expires; and/or equal to a periodic registration duration (e.g., timer) value that was provided to the WTRU by the AMF.

The indication of an expected action when the WTRU becomes available, may indicate that the WTRU is (e.g., expected) to perform a mobility registration if (e.g., when) the unavailability period is over, or indicate that the WTRU is (e.g., expected) to perform an initial registration if (e.g., when) the unavailability period is over.

The AMF may indicate that the WTRU is (e.g., expected) to perform a mobility registration if (e.g., when) the unavailability period is over, for example, if the WTRU provided the unavailability period duration in a mobility registration request.

The AMF may indicate that the WTRU is (e.g., expected) to perform an initial registration if (e.g., when) the unavailability period is over, for example, if the WTRU provided the unavailability period duration in a de-registration request.

Providing an indication of the expected action if (e.g., when) the WTRU becomes available to the consumer NF (e.g., the NWDAF) may be useful (e.g., important), for example, because the expected action may impact the amount of network activity (e.g., that may be required) if (e.g., when) the WTRU becomes available. For example, an initial registration procedure may result in more signaling than a mobility registration procedure. The consumer NF may (e.g., be able to) generate more accurate statistics and/or predictions, for example, if the consumer NF (e.g., NWDAF) is informed about what action is expected.

Figure 8:
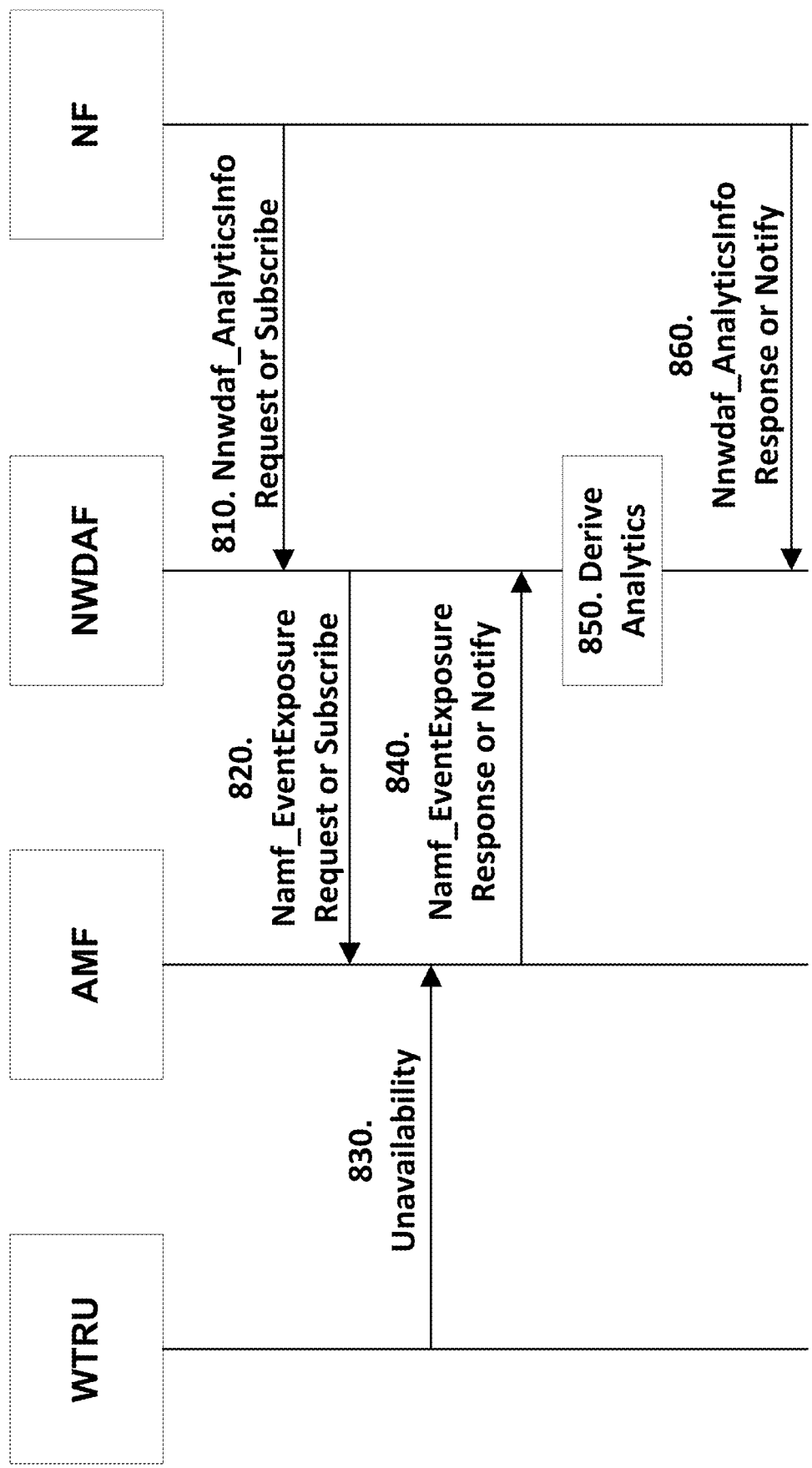
FIG. 8 illustrates an example of using unavailability information to generate improved data analytics.

FIG. 8 shows an example procedure where the AMF provides unavailability information to the NWDAF. The NWDAF may use the unavailability information to generate more accurate statistics and/or predictions. The NWDAF may provide the statistics and/or predictions to a consumer NF, such as a PCF, AMF, NSSF, NEF, SMF, and/or AF.

FIG. 8 illustrates an example of using unavailability information to generate improved data analytics.

As shown in FIG. 8, at 810, a consumer NF (e.g., PCF, AMF, NSSF, NEF, SMF, or AF) may invoke a service (e.g., the NWDAF's Nnwdaf_AnalytcisInfo service). The type of service invocation may be a request or subscribe operation. The type of analytics requested may be, for example, one or more of the following: Network Slice Instance load level statistics and predictions; Network Slice load level statistics and predictions; Network Function load level statistics and predictions; Network load level statistics and predictions; WTRU communication statistics and predictions; and/or Sixth WTRU abnormal behavior statistics and predictions.

At 820, the NWDAF may (e.g., begin to) collect data that may be necessary to determine the information that was requested at 810. As part of the process of collecting the necessary data, the NWDAF may invoke the AMF's Namf_EventExposure service operation. The type of service invocation may be a request or subscribe operation. The value of the Event ID that may be provided by the NWDAF to the AMF in the operation may be one or more of the following: a Registration-State-Report; a Connectivity-State-Report; a Reachability-Report; UEs-In-Area-Report; 5GS-User-State-Report; Frequent-Mobility-Registration-Report; UE-Access-Behavior-Trends; UE-MM-Transaction-Report; and/or "WTRU unavailability information."

At 830, the AMF may receive an NAS Registration Request or an NAS De-Registration Request, which may include an unavailability period duration. In examples, operations at 830 may occur before operations at 820.

At 840, an operation may depend on the operation at 820. For example, if the action at 820 is a request operation, then, at 840 the AMF may respond (e.g., immediately) to the NWDAF with the unavailability time information and/or with an indication of an expected action if (e.g., when) the WTRU becomes available. The response may provide the information for one or more WTRUs. For example, if the action at 820 is a subscribe operation, then, the NAS message at 830 may trigger the AMF to send a notification to the NWDAF at 840. The notification may include the unavailability time information and/or an indication of an expected action when the WTRU becomes available. The notification may provide the information for one or more WTRUs.

At 850, the NWDAF may derive the analytics (e.g., statistics or predictions) that were requested at 810. The analytics may be derived based on the unavailability time information and/or indication of an expected action when the WTRU becomes available.

At 860, the NWDAF may send the analytics to the consumer NF in a notify or response service operation.

An unavailability period feature may be supported for relay WTRUs. A Relay WTRU may enter an unavailability period.

In an example procedure, a relay WTRU may detect that it needs to enter a period where the WTRU may be unavailable.

In some examples, remote WTRUs and relay WTRU may be connected (e.g., via the PC5 connection). One or the other of a Relay WTRU or a Remote WTRU may become unavailable due to the unavailability event.

Figure 9:
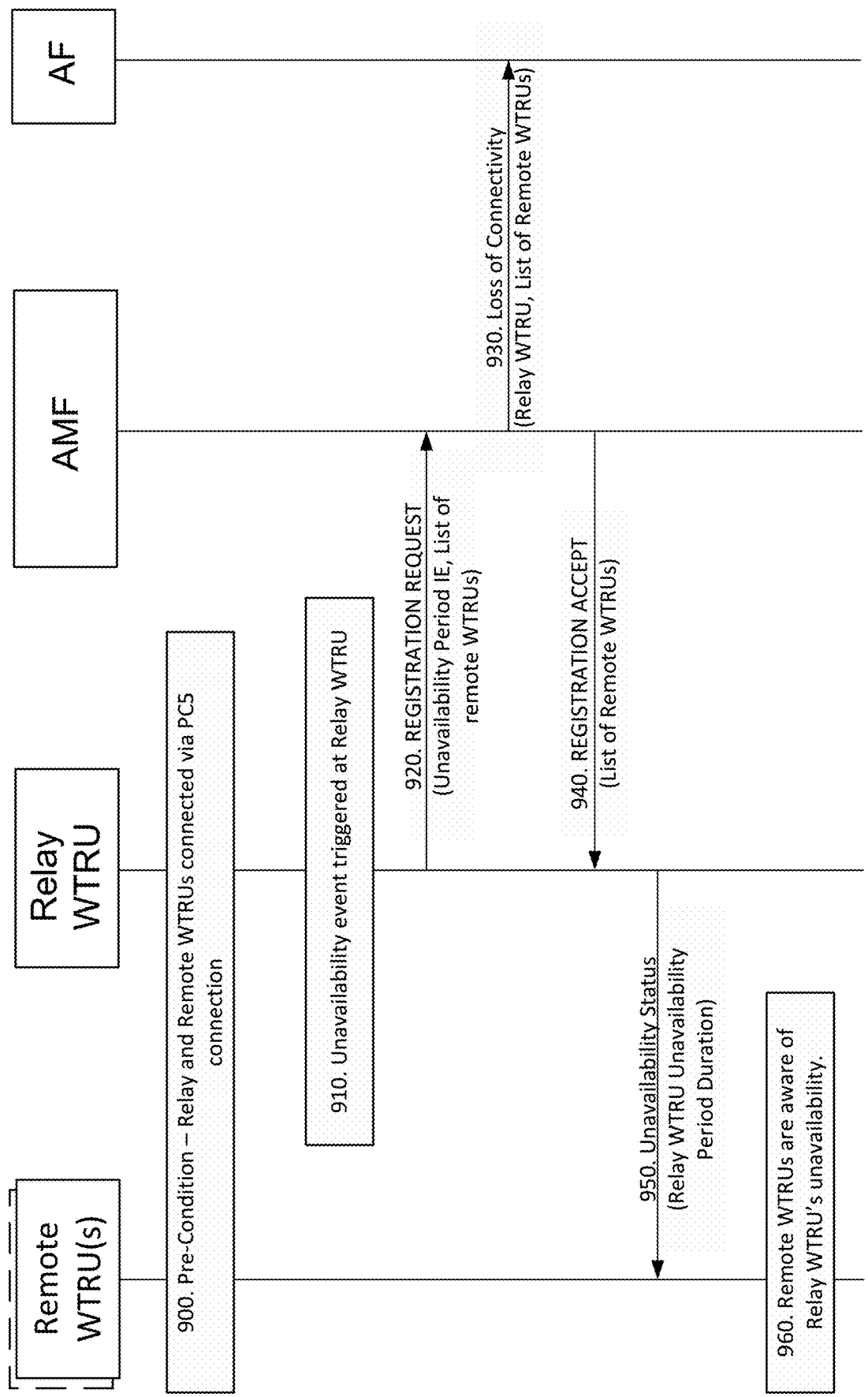
FIG. 9 illustrates an example of a relay WTRU entering an unavailability period.

FIG. 9 illustrates an example of a relay WTRU entering an unavailability period.

As shown in FIG. 9, at 900, a relay WTRU and one or more remote WTRUs may be connected via PC5 connection.

At 910, an unavailability event may be triggered at the Relay WTRU that may make the Relay WTRU unavailable for a (e.g., certain) period of time.

At 920, the Relay WTRU may enter the unavailability period, for example, by sending a REGISTRATION REQUEST message to the AMF. The message may include the unavailability period IE and/or the list of remote WTRUs that may be connected to the Relay WTRU, e.g., via PC5. The list of remote WTRUs may inform the AMF about the connected remote WTRUs that may no longer be available via the Relay WTRU.

At 930, a list of remote WTRUs information may be passed by the AMF to the AF for the loss of connectivity event (e.g., provided AF has registered for the loss of connectivity event for the respective remote WTRUs).

At 940, the AMF may respond with the REGISTRATION ACCEPT providing the list of remote WTRUs, e.g., confirming the status of reception of the list.

At 950, the Relay WTRU may inform the connected remote WTRUs about the unavailability of the relay WTRU, e.g., along with the unavailability period duration.

At 960, the Remote WTRUs may be aware of the relay WTRU's unavailability. The Remote WTRUs may use the unavailability of the relay WTRU as a trigger to buffer UL activity, trigger selection to a different relay WTRU, establish a direct connection to the (e.g., 5G) network, and/or provide information about the unavailability period (e.g., via (de) registration procedure) to the network.

A Remote WTRU may enter an Unavailability Period.

Figure 10:
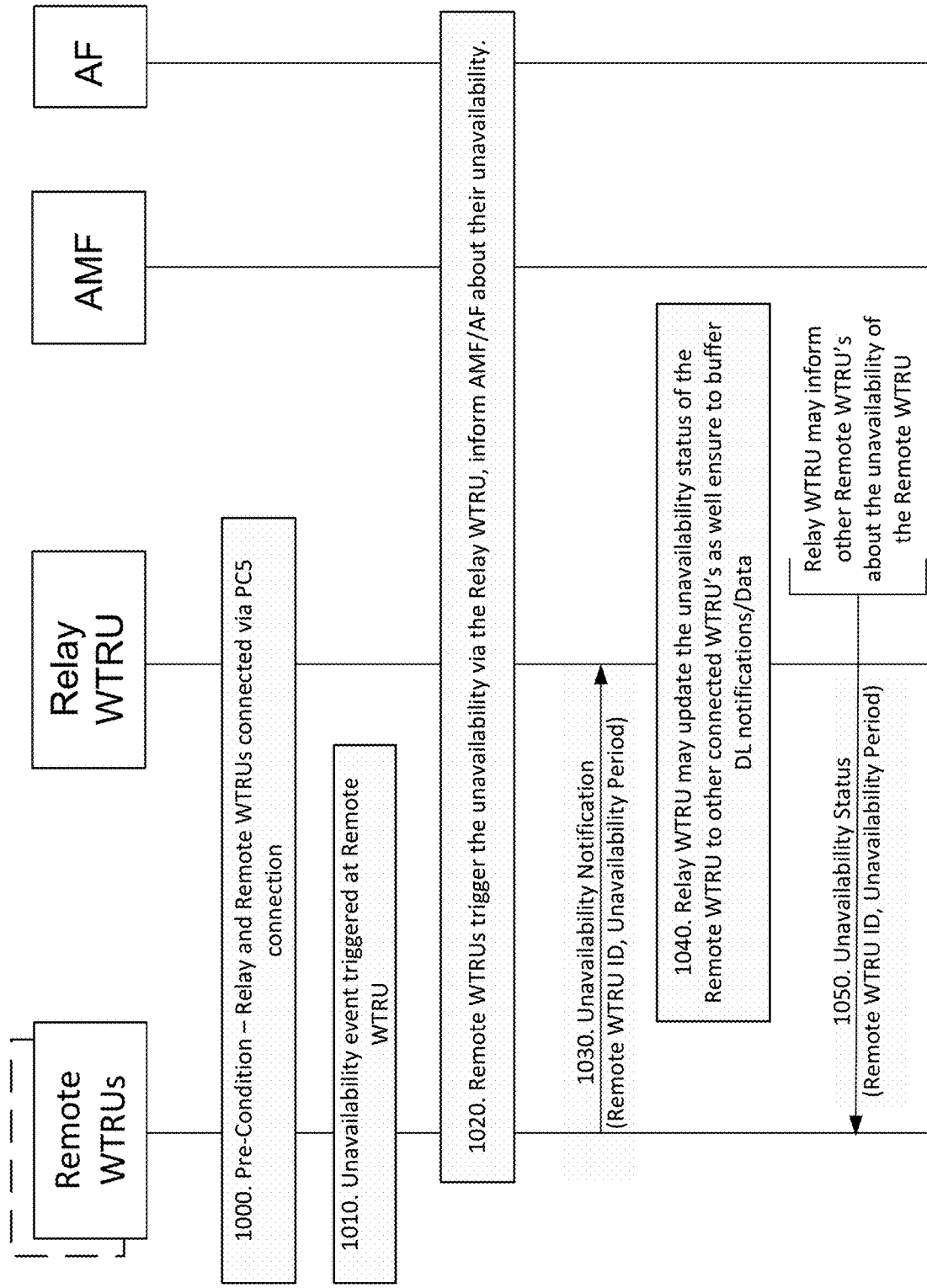
FIG. 10 illustrates an example of a remote WTRU entering an unavailability period.

FIG. 10 illustrates an example of a remote WTRU entering an unavailability period.

As shown in FIG. 10, at 1000, a Relay WTRU and one or more Remote WTRUs may be connected via PC5 connection.

At 1010, an unavailability event may be triggered at the Remote WTRU that may make the Remote WTRU unavailable for a (e.g., certain) period of time.

At 1020, the Remote WTRU may trigger the unavailability, for example, via the relay WTRU, for example, such as by informing the AMF/AF about the unavailability event via the relay WTRU.

At 1030, the Remote WTRU may provide the information about the unavailability to the relay WTRU (e.g., via an Unavailability Notification message), for example, which may include an unavailability period duration and/or a remote WTRU ID.

At 1040, the Relay WTRU may update the unavailability status of the Remote WTRU to other connected WTRUs. The relay WTRU and/or the other connected WTRUs (e.g., aware of the unavailability) may buffer DL notifications/data (e.g., while the Remote WTRU is unavailable).

At 1050, the Relay WTRU may inform other remote WTRUs about the unavailability of the remote WTRU. The Relay WTRU may provide the remote WTRU ID and/or unavailability period duration.

The remote WTRU (e.g., upon becoming available again) may use the same or similar procedure shown in FIG. 10 to indicate availability. For example, the remote WTRU may provide to the Relay WTRU an unavailability notification message with unavailability indicated as not applicable. The remote WTRU may provide its remote WTRU ID. The relay WTRU may, in examples, broadcast the availability information to other connected remote WTRUs.

Accounting may be provided for expected WTRU availability when an unavailability period is requested. As described herein, a WTRU may use MICO mode. A WTRU may apply a strictly periodic registration timer feature when using a MICO Mode.

A WTRU may send a registration request message to the network. The registration request message may include, for example, one or more of the following information elements: a request to use MICO mode; an indication of whether the strictly periodic registration timer is supported by the WTRU; a requested active duration (e.g., timer) value (e.g., T3324); and/or a requested registration duration (e.g., timer) value (e.g., Requested T3512 value).

The AMF may send a registration accept message to the WTRU. The registration accept message may include, for example, one or more of the following information elements: an indication to use MICO mode; an indication of whether the strictly periodic registration timer is supported by the network; an active duration (e.g., timer) value (e.g., T3324); and/or a registration duration (e.g., timer) value (e.g., requested T3512 value).

As described herein, the AMF may configure the WTRU that uses MICO mode so that the WTRU is available at predictable times. The configuration may be implemented by the AMF selecting values for the T3324 and T3512 times and/or by the AMF determining whether to enable the strictly periodic registration duration (e.g., timer).

The WTRU may (e.g., determine to) send a registration request to the AMF. The registration request may include an unavailability period duration. The AMF may detect that the unavailability period overlaps with a time period when the WTRU, which may be using MICO mode, is expected to be available for downlink data. The WTRU may not be reachable for downlink data at a time when the 5G System or an application server expects the WTRU to be available, for example, if the WTRU becomes unreachable immediately after the registration accept message is sent and the WTRU stays in an unreachable state for the unavailability period duration. The AMF may indicate in a Registration Accept Message that the unavailability period is not accepted. The WTRU may (e.g., then) determine when it may be acceptable to again request the unavailability period.

The registration accept message may indicate that the strictly periodic registration duration (e.g., timer) feature is enabled and that the unavailability period was not accepted. The WTRU may (e.g., in response to the registration accept message) wait to again request an unavailability period duration until the registration duration (e.g., timer) expires, send a registration request based on the registration duration (e.g., timer) expiring, and enter the CM-IDLE state when the active duration (e.g., timer) is not running. By waiting until these conditions are met, it may be ensured that the WTRU's expected availability time has ended (e.g., just passed). This approach may be useful, for example, in cases where the WTRU requests an unavailability period duration when the strictly periodic registration time is close to expiring.

The registration accept message may indicate that the strictly periodic registration timer feature is not enabled and that the unavailability period was not accepted. The WTRU may (e.g., in response to the registration accept message) wait to again request an unavailability period duration until the WTRU enters the CM-IDLE state and the active duration (e.g., timer) is not running. By waiting until these conditions are met, it may be ensured that the WTRU's expected availability time has ended (e.g., just passed).

The WTRU may (e.g., alternatively) determine to (e.g., again) request an unavailability period duration, for example, if the WTRU receives a WTRU Configuration Update message or another Registration Accept Message that disables MICO mode or the strictly periodic registration duration (e.g., timer) feature.

The registration accept message may indicate that the MICO mode is not enabled and that the unavailability period was not accepted. The WTRU may (e.g., in response to the registration accept message) track a duration (e.g., configure a timer) with the unavailability period and may refrain from requesting (e.g., not request) the unavailability period again until the wait duration (e.g., timer) expires and the WTRU has entered the CM-IDLE state.

The WTRU may (e.g., alternatively) determine (e.g., at any time) to (e.g., again) send an unavailability period duration in a de-registration request. An example of the procedure is illustrated in FIG. 11.

Figure 11:
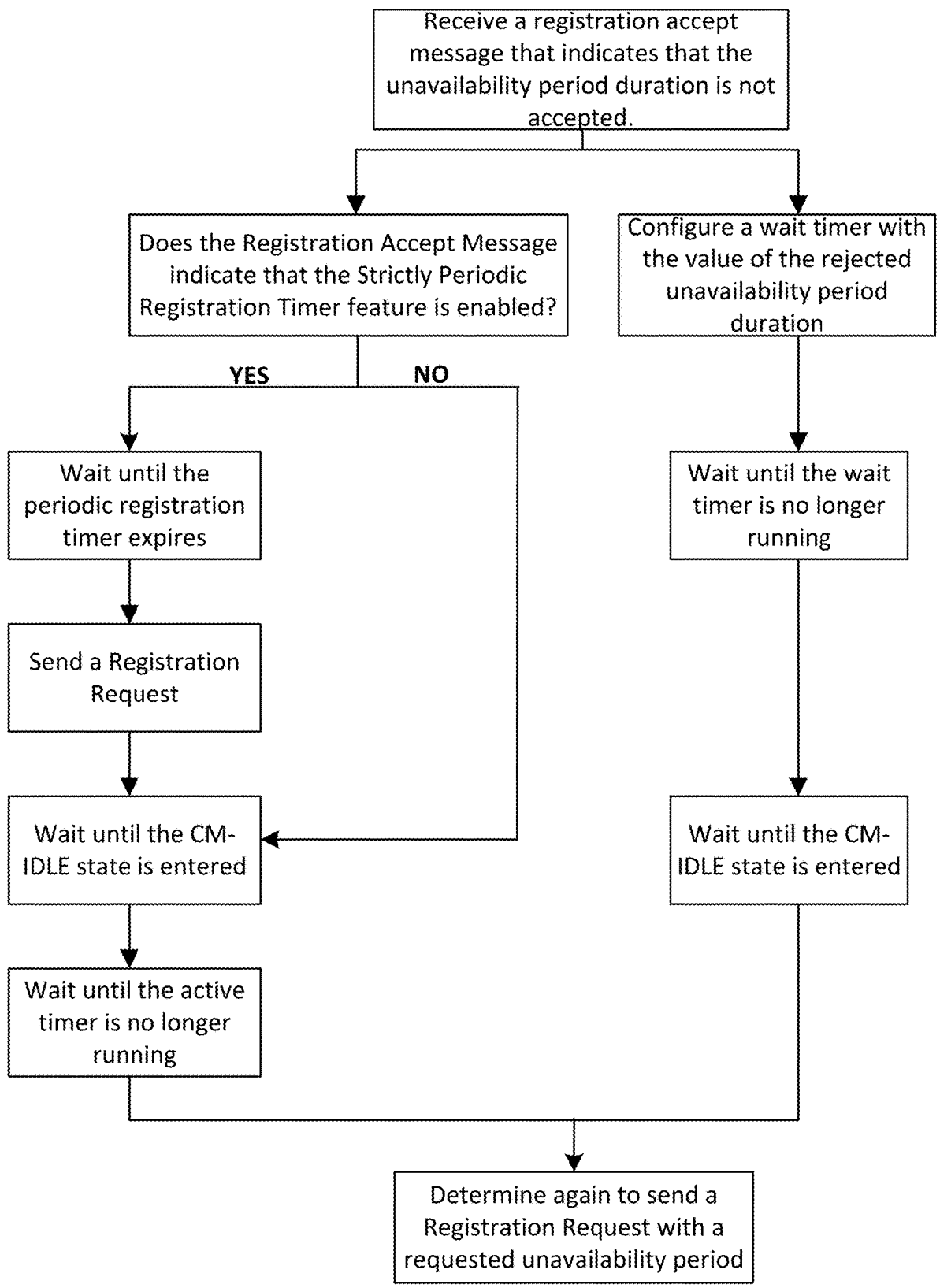
FIG. 11 illustrates an example of logic for WTRU handling of an unavailability period rejection.

FIG. 11 illustrates an example of logic for WTRU handling of an unavailability period rejection. FIG. 11 shows an example for how to account for expected WTRU availability when an unavailability period is requested.

As shown in FIG. 11, a WTRU may (e.g., when MICO Mode and the strictly periodic registration duration/timer feature are enabled) send a registration request that includes an unavailability period duration. The WTRU may receive a registration accept message, which may indicate that MICO Mode is enabled, the strictly periodic registration timer feature is enabled, and that the unavailability period duration is not allowed. The WTRU may determine to send a second registration request that includes a second unavailability period duration on the conditions that a periodic registration duration (e.g., timer) expired, the WTRU has entered the CM-IDLE state, and an active duration (e.g., timer) is not running. The WTRU may send the second registration request, which may include a second unavailability period duration.

As shown in FIG. 11, a WTRU may (e.g., when MICO Mode and the strictly periodic registration timer feature are not enabled) send a registration request that includes an unavailability period duration. The WTRU may receive a registration accept message, which may indicate that MICO Mode is enabled, the strictly periodic registration duration (e.g., timer) feature is not enabled, and that the unavailability period duration is not allowed. The WTRU may determine to send a second registration request that includes a second unavailability period duration, for example, on the conditions that the WTRU has entered the CM-IDLE state, and an active duration (e.g., timer) is not running. The WTRU may send the second registration request, for example, which includes a second unavailability period duration.

As shown in FIG. 11, a WTRU may (e.g., when MICO mode is not enabled) send a registration request, which may include an unavailability period duration. The WTRU may receive a registration accept message that refrains from indicating (e.g., does not indicate) that MICO Mode is enabled, and that the unavailability period duration is not allowed. The WTRU may configure and start tracking a duration (e.g., start a timer) with the unavailability period duration. The WTRU may determine to send a second registration request that includes a second unavailability period duration on the conditions that the duration (e.g., timer) is not running and the WTRU has entered the CM-IDLE state. The WTRU may send the second registration request that includes a second unavailability period duration.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed is:

1. A multiple USIM (MUSIM) wireless transmit/receive unit (WTRU) comprising:
a processor configured to:
initiate registration to a first network and to a second network;
determine that an event is triggered that would make the WTRU unavailable;
initiate a first mobility registration update procedure with the first network, wherein the first mobility registration update procedure comprises sending a first registration request to the first network, wherein the first registration request indicates a first unavailability duration associated with an unavailability period;
receive a first registration response from the first network, wherein the first registration response indicates a first periodic registration timer value;
initiate a second mobility registration update procedure with the second network, wherein the second mobility registration update procedure comprises sending a second registration request to the second network, wherein the second registration request indicates a second unavailability duration; and
receive a second registration response from the second network, wherein the second registration response indicates a second periodic registration timer value.

2. The MUSIM WTRU of claim 1, wherein the second unavailability duration differs from the first unavailability duration.

3. The MUSIM WTRU of claim 1, wherein the second unavailability duration is the same as the first unavailability duration.

4. The MUSIM WTRU of claim 1, wherein the first periodic registration timer value is based on the unavailability period.

5. The MUSIM WTRU of claim 1, wherein the second periodic registration timer value is based on the second unavailability duration.

6. The MUSIM WTRU of claim 1, wherein the first registration response further indicates that the first network does not support unavailability, and wherein the processor is further configured to initiate a first deregistration procedure with the first network, wherein the first deregistration procedure comprises sending a first deregistration request to the first network.

7. The MUSIM WTRU of claim 6, the second registration response further indicates that the second network does not support unavailability, and wherein the processor is further configured to initiate a second deregistration procedure with the second network, wherein the second deregistration procedure comprises sending a second deregistration request to the second network.

8. The MUSIM WTRU of claim 1, wherein the processor is further configured to execute the event that would make the WTRU unavailable.

9. The WTRU of claim 1, wherein the second periodic registration timer value is greater than or equal to the first unavailability duration.

10. The WTRU of claim 1, wherein the first registration request further indicates a request to activate an unavailability period feature with the first network.

11. A method performed by a multiple USIM (MUSIM) wireless transmit/receive unit (WTRU), the method comprising:
initiating registration to a first network and to a second network;
determining that an event is triggered that would make the WTRU unavailable;
initiating a first mobility registration update procedure with the first network, wherein the first mobility registration update procedure comprises sending a first registration request to the first network, wherein the first registration request indicates a first unavailability duration associated with an unavailability period;
receiving a first registration response from the first network, wherein the first registration response indicates a first periodic registration timer value;
initiating a second mobility registration update procedure with the second network, wherein the second mobility registration update procedure comprises sending a second registration request to the second network, wherein the second registration request indicates a second unavailability duration; and
receiving a second registration response from the second network, wherein the second registration response indicates a second periodic registration timer value.

12. The method of claim 11, wherein the second unavailability duration differs from the first unavailability duration.

13. The method of claim 11, wherein the second unavailability duration is the same as the first unavailability duration.

14. The method of claim 11, wherein the first periodic registration timer value is based on the unavailability period.

15. The method of claim 11, wherein the second periodic registration timer value is based on the second unavailability duration.

16. The method of claim 11, wherein the first registration response further indicates that the first network does not support unavailability, wherein the method further comprises initiating a first deregistration procedure with the first network, and wherein the first deregistration procedure comprises sending a first deregistration request to the first network.

17. The method of claim 16, wherein the second registration response further indicates that the second network does not support unavailability, wherein the method further comprises initiating a second deregistration procedure with the second network, and wherein the second deregistration procedure comprises sending a second deregistration request to the second network.

18. The method of claim 11, wherein the method further comprises executing the event that would make the WTRU unavailable.

19. The method of claim 11, wherein the second periodic registration timer value is greater than or equal to the first unavailability duration.

20. The method of claim 11, wherein the first registration request further indicates a request to activate an unavailability period feature with the first network.

* * * * *